(12) United States Patent
Wu et al.

(10) Patent No.: US 12,088,188 B2
(45) Date of Patent: Sep. 10, 2024

(54) WIRELESS CHARGING CONTROL METHOD, AND WIRELESS CHARGING TRANSMITTER AND SYSTEM

(71) Applicant: Huawei Technologies Co., Ltd., Shenzhen (CN)

(72) Inventors: Zhixian Wu, Dongguan (CN); Yunhe Mao, Shenzhen (CN); Xiaosheng Zeng, Shenzhen (CN); Shuangquan Chen, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 805 days.

(21) Appl. No.: 17/144,764

(22) Filed: Jan. 8, 2021

(65) Prior Publication Data

US 2021/0135498 A1   May 6, 2021

Related U.S. Application Data

(63) Continuation of application No. PCT/CN2019/077263, filed on Mar. 7, 2019.

(30) Foreign Application Priority Data

Jul. 10, 2018   (CN) .......................... 201810752499.X

(51) Int. Cl.
*H02M 1/00* (2007.01)
*B60L 53/122* (2019.01)
(Continued)

(52) U.S. Cl.
CPC ............ *H02M 1/007* (2021.05); *B60L 53/122* (2019.02); *H02J 7/02* (2013.01); *H02J 50/12* (2016.02);
(Continued)

(58) Field of Classification Search
USPC ........................................................ 320/108
See application file for complete search history.

(56) References Cited

U.S. PATENT DOCUMENTS

2013/0033118 A1\* 2/2013 Karalis ................. B60L 53/126
307/104
2015/0061578 A1\* 3/2015 Keeling .............. H02J 7/00047
320/108
(Continued)

FOREIGN PATENT DOCUMENTS

CN      102185533 A    9/2011
CN      103078381 A    5/2013
(Continued)

*Primary Examiner* — Mohammed Alam
(74) *Attorney, Agent, or Firm* — Conley Rose, P.C.

(57) ABSTRACT

A wireless charging control method for an electric vehicle or a wireless charging transmitter includes an inner-loop control circuit, a boost circuit, an inverter circuit, and a transmitting coil, where the inner-loop control circuit is coupled to both the boost circuit and the inverter circuit, and an input end and an output end of the inverter circuit are respectively coupled to the boost circuit and the transmitting coil, and the inner-loop control circuit is configured to obtain a first current reference signal and a sampled current signal of the transmitting coil, compare the first current reference signal with the sampled current signal to obtain an absolute value of a difference between the first current reference signal and the sampled current signal, and adjust a phase shift angle of the inverter circuit or a duty cycle of the boost circuit when the absolute value is greater than a preset deviation.

20 Claims, 12 Drawing Sheets

(51) Int. Cl.
  *H02J 7/02*   (2016.01)
  *H02J 50/12*  (2016.01)
  *H02J 50/80*  (2016.01)
  *H02M 3/00*   (2006.01)
  *H02M 3/335*  (2006.01)

(52) U.S. Cl.
  CPC .............. *H02J 50/80* (2016.02); *H02M 3/01* (2021.05); *H02M 3/33573* (2021.05)

(56) References Cited

U.S. PATENT DOCUMENTS

| | | | |
|---|---|---|---|
| 2016/0134131 A1* | 5/2016 | Murayama | B60L 53/126 307/104 |
| 2017/0222469 A1* | 8/2017 | Tustin | H02J 50/80 |
| 2017/0361723 A1* | 12/2017 | Elshaer | B60L 53/126 |
| 2018/0236879 A1* | 8/2018 | Elshaer | H02J 50/90 |

FOREIGN PATENT DOCUMENTS

| | | |
|---|---|---|
| CN | 103560599 A | 2/2014 |
| CN | 103840528 A | 6/2014 |
| CN | 103843229 A | 6/2014 |
| CN | 104158269 A | 11/2014 |
| CN | 104578455 A | 4/2015 |
| CN | 104795903 A | 7/2015 |
| CN | 104821667 A | 8/2015 |
| CN | 205646956 U | 10/2016 |
| CN | 106451685 A | 2/2017 |
| CN | 107017706 A | 8/2017 |
| CN | 107968461 A | 4/2018 |
| WO | 2017047454 A1 | 3/2017 |

\* cited by examiner

WIRELESS CHARGING CONTROL METHOD, AND WIRELESS CHARGING TRANSMITTER AND SYSTEM

CROSS-REFERENCE TO RELATED APPLICATIONS

This application is a continuation of International Patent Application No. PCT/CN2019/077263 filed on Mar. 7, 2019, which claims priority to Chinese Patent Application No. 201810752499.X filed on Jul. 10, 2018. The disclosures of the aforementioned applications are hereby incorporated by reference in their entireties.

TECHNICAL FIELD

This application relates to the wireless charging field, and in particular, to a wireless charging control method, and a wireless charging transmitter and system.

BACKGROUND

As energy shortage and environmental pollution become more serious, electric vehicles as new energy vehicles have received widespread attention. An electric vehicle charging method includes contact charging and wireless charging. During contact charging, electricity is conducted through metal contact between a plug and a socket, while during wireless charging, a coupled electromagnetic field is used as a medium to transmit electric energy. Compared with the contact charging mode, the wireless charging mode has the following advantages: on one hand, wireless charging is convenient and safe to use and free from issues such as sparks, risk of electric shock, dust, a contact loss, mechanical wear, and corresponding maintenance problems, and the wireless charging mode can adapt to various severe environments and weather conditions. On the other hand, wireless charging is convenient for unmanned automatic charging and mobile charging, owing to frequent charging, a capacity of a power battery installed in an electric vehicle can be greatly reduced on a premise that required endurance mileage is ensured, thereby reducing a weight of the vehicle body and improving effective utilization of energy, and wireless charging helps to reduce initial acquisition costs of electric vehicles, and resolves a high-cost problem of the electric vehicles incurred by use of large-capacity batteries, thereby promoting popularization of electric vehicles. Therefore, the application of a wireless charging technology may be one of key technologies for fueling the entire market for the electric vehicle industry.

Currently, wireless charging systems for vehicles mostly use a magnetic resonance principle, that is, a wireless charging receiver located at the bottom of a vehicle and a wireless charging transmitter installed on the ground work together to implement non-contact charging. In an actual wireless charging system, because a relative position between a coil of a wireless charging transmitter (or a transmitting coil) and a coil of a wireless charging receiver (or a receiving coil) may vary, a voltage variation range of a load is relatively wide, a charging characteristic of the load changes, and the like, output impedance of an inverter circuit in the wireless charging transmitter changes. Consequently, a variation range of a current, of the transmitting coil, that needs to be adjusted in a charging process is relatively wide, resulting in a relatively large power loss of the wireless charging system.

SUMMARY

This application provides a wireless charging control method, and a wireless charging transmitter and system. According to technical solutions of this application, a current adjustment range of a transmitting coil can be effectively expanded to implement optimal efficiency control in a full working range, thereby reducing a power loss of a wireless charging system.

According to a first aspect, this application provides a wireless charging transmitter, including an inner-loop control circuit, a boost circuit, an inverter circuit, and a transmitting coil, where the inner-loop control circuit is connected to both the boost circuit and the inverter circuit, and an input end and an output end of the inverter circuit are respectively connected to the boost circuit and the transmitting coil, and the inner-loop control circuit is configured to obtain a first current reference signal and a sampled current signal of the transmitting coil, compare the first current reference signal with the sampled current signal to obtain an absolute value of a difference between the first current reference signal and the sampled current signal, and adjust a phase shift angle of the inverter circuit and/or a duty cycle of the boost circuit when the absolute value is greater than a preset deviation such that after the adjustment, an absolute value of a difference between the first current reference signal and the sampled current signal of the transmitting coil is less than or equal to the preset deviation.

Beneficial effects of the technical solution of this application include the following. The phase shift angle of the inverter circuit and/or the duty cycle of the boost circuit are/is adjusted by the inner-loop control circuit such that after the adjustment, the absolute value of the difference between the first current reference signal and the first sampled current signal of the transmitting coil of the wireless charging transmitter is less than or equal to the preset deviation. In this way, a current adjustment range of the transmitting coil can be effectively expanded to implement optimal efficiency control in a full working range, thereby reducing a power loss of a wireless charging system.

In an optional manner 1, the inner-loop control circuit is further configured to, when the absolute value is greater than the preset deviation, and the phase shift angle of the inverter circuit is less than a maximum preset phase shift angle, increase the phase shift angle of the inverter circuit, and obtain the first current reference signal and the sampled current signal of the transmitting coil, or when the absolute value is greater than the preset deviation, the phase shift angle of the inverter circuit is greater than or equal to a maximum preset phase shift angle, and the duty cycle of the boost circuit is less than a maximum preset duty cycle, increase the duty cycle of the boost circuit, and obtain the first current reference signal and the sampled current signal of the transmitting coil.

In an optional manner 2, the inner-loop control circuit is further configured to, when the absolute value is greater than the preset deviation, and the duty cycle of the boost circuit is less than a maximum preset duty cycle, increase the duty cycle of the boost circuit, and obtain the first current reference signal and the sampled current signal of the transmitting coil, or when the absolute value is greater than the preset deviation, the duty cycle of the boost circuit is greater than or equal to a maximum preset duty cycle, and the phase shift angle of the inverter circuit is less than a maximum preset phase shift angle, increase the phase shift angle of the inverter circuit, and obtain the first current reference signal and the sampled current signal of the transmitting coil.

In an optional manner 3, the inner-loop control circuit is further configured to, when the absolute value is greater than the preset deviation, and the duty cycle of the boost circuit is greater than a minimum preset duty cycle, decrease the duty cycle of the boost circuit, and obtain the first current reference signal and the sampled current signal of the transmitting coil, or when the absolute value is greater than the preset deviation, the duty cycle of the boost circuit is less than or equal to a minimum preset duty cycle, and the phase shift angle of the inverter circuit is greater than a minimum preset phase shift angle, decrease the phase shift angle of the inverter circuit, and obtain the first current reference signal and the sampled current signal of the transmitting coil.

In an optional manner 4, the inner-loop control circuit is further configured to, when the absolute value is greater than the preset deviation, and the phase shift angle of the inverter circuit is greater than a minimum preset phase shift angle, decrease the phase shift angle of the inverter circuit, and obtain the first current reference signal and the sampled current signal of the transmitting coil, or when the absolute value is greater than the preset deviation, the phase shift angle of the inverter circuit is less than or equal to a minimum preset phase shift angle, and the duty cycle of the boost circuit is greater than a minimum preset duty cycle, decrease the duty cycle of the boost circuit.

Beneficial effects of the technical solution of this application include the following. The inner-loop control circuit may be configured to perform adjustment in any of the foregoing four optional manners such that after the adjustment, the absolute value of the difference between the first current reference signal and the first sampled current signal of the transmitting coil of the wireless charging transmitter is less than or equal to the preset deviation. In this way, the current adjustment range of the transmitting coil can be effectively expanded to implement optimal efficiency control in the full working range, thereby reducing the power loss of the wireless charging system.

Optionally, the inner-loop control circuit includes a primary-side current compensator. The inner-loop control circuit is further configured to control a current of the transmitting coil using the primary-side current compensator.

Beneficial effects of the technical solutions of this application include the following. Variation ranges of the duty cycle of the boost circuit and the phase shift angle of the inverter circuit can become smaller under control using the primary-side current compensator, to implement optimal efficiency control in the full working range, thereby reducing the power loss of the wireless charging system.

Optionally, the wireless charging transmitter further includes the boost circuit configured to obtain a direct current voltage and the duty cycle of the boost circuit, and increase the direct current voltage based on the duty cycle of the boost circuit.

Beneficial effects of the technical solution of this application include the following. In this application, a conduction loss of switch tubes in the inverter circuit and a voltage conversion circuit can be reduced by adding the boost circuit at an input end of the inverter circuit.

Optionally, the wireless charging transmitter further includes an outer-loop control circuit configured to obtain a second current reference signal and a second sampled current signal, or a voltage reference signal and a sampled voltage signal, and generate the first current reference signal based on the second current reference signal and the second sampled current signal or based on the voltage reference signal and the sampled voltage signal, and output the first current reference signal to the inner-loop control circuit.

The following provides a wireless charging control method and a system. For effects thereof, refer to of the technical effect of the wireless charging transmitter. Details are not described again in the following.

According to a second aspect, this application provides a wireless charging control method, including obtaining a first current reference signal and a sampled current signal of a transmitting coil, comparing the first current reference signal with the sampled current signal to obtain an absolute value of a difference between the first current reference signal and the sampled current signal, and adjusting a phase shift angle of an inverter circuit and/or a duty cycle of a boost circuit when the absolute value is greater than a preset deviation such that after the adjustment, an absolute value of a difference between the first current reference signal and the sampled current signal of the transmitting coil is less than or equal to the preset deviation.

Optionally, adjusting a phase shift angle of an inverter circuit and/or a duty cycle of a boost circuit when the absolute value is greater than a preset deviation such that after the adjustment, an absolute value of a difference between the first current reference signal and the sampled current signal of the transmitting coil is less than or equal to the preset deviation includes, when the absolute value is greater than the preset deviation, and the phase shift angle of the inverter circuit is less than a maximum preset phase shift angle, increasing the phase shift angle of the inverter circuit, and obtaining the first current reference signal and the sampled current signal of the transmitting coil, or when the absolute value is greater than the preset deviation, the phase shift angle of the inverter circuit is greater than or equal to a maximum preset phase shift angle, and the duty cycle of the boost circuit is less than a maximum preset duty cycle, increasing the duty cycle of the boost circuit, and obtaining the first current reference signal and the sampled current signal of the transmitting coil.

Optionally, adjusting a phase shift angle of an inverter circuit and/or a duty cycle of a boost circuit when the absolute value is greater than a preset deviation such that after the adjustment, an absolute value of a difference between the first current reference signal and the sampled current signal of the transmitting coil is less than or equal to the preset deviation includes, when the absolute value is greater than the preset deviation, and the duty cycle of the boost circuit is less than a maximum preset duty cycle, increasing the duty cycle of the boost circuit, and obtaining the first current reference signal and the sampled current signal of the transmitting coil, or when the absolute value is greater than the preset deviation, the duty cycle of the boost circuit is greater than or equal to a maximum preset duty cycle, and the phase shift angle of the inverter circuit is less than a maximum preset phase shift angle, increasing the phase shift angle of the inverter circuit, and obtaining the first current reference signal and the sampled current signal of the transmitting coil.

Optionally, adjusting a phase shift angle of an inverter circuit and/or a duty cycle of a boost circuit when the absolute value is greater than a preset deviation such that after the adjustment, an absolute value of a difference between the first current reference signal and the sampled current signal of the transmitting coil is less than or equal to the preset deviation includes, when the absolute value is greater than the preset deviation, and the duty cycle of the boost circuit is greater than a minimum preset duty cycle, decreasing the duty cycle of the boost circuit, and obtaining the first current reference signal and the sampled current signal of the transmitting coil, or when the absolute value is greater than the preset deviation, the duty cycle of the boost circuit is less than or equal to a minimum preset duty cycle, and the phase shift angle of the inverter circuit is greater than a minimum preset phase shift angle, decreasing the phase shift angle of the inverter circuit, and obtaining the first current reference signal and the sampled current signal of the transmitting coil.

Optionally, adjusting a phase shift angle of an inverter circuit and/or a duty cycle of a boost circuit when the absolute value is greater than a preset deviation such that after the adjustment, an absolute value of a difference between the first current reference signal and the sampled current signal of the transmitting coil is less than or equal to the preset deviation includes, when the absolute value is greater than the preset deviation, and the phase shift angle of the inverter circuit is greater than a minimum preset phase shift angle, decreasing the phase shift angle of the inverter circuit, and obtaining the first current reference signal and the sampled current signal of the transmitting coil, or when the absolute value is greater than the preset deviation, the phase shift angle of the inverter circuit is less than or equal to a minimum preset phase shift angle, and the duty cycle of the boost circuit is greater than a minimum preset duty cycle, decreasing the duty cycle of the boost circuit.

Optionally, the method further includes controlling a current of the transmitting coil using a primary-side current compensator.

Optionally, the method further includes obtaining a direct current voltage and the duty cycle of the boost circuit, and increasing the direct current voltage based on the duty cycle of the boost circuit.

Optionally, the method further includes obtaining a second current reference signal and a second sampled current signal, or a voltage reference signal and a sampled voltage signal, and generating the first current reference signal based on the second current reference signal and the second sampled current signal or based on the voltage reference signal and the sampled voltage signal, and outputting the first current reference signal to the inner-loop control circuit.

According to a third aspect, this application provides a wireless charging system, including a wireless charging receiver and the wireless charging transmitter according to the first aspect or the optional manners of the first aspect.

Optionally, the wireless charging receiver or the wireless charging transmitter includes an outer-loop control circuit configured to obtain a second current reference signal and a second sampled current signal, or a voltage reference signal and a sampled voltage signal, and generate a first current reference signal based on the second current reference signal and the second sampled current signal or based on the voltage reference signal and the sampled voltage signal, and output the first current reference signal to an inner-loop control circuit.

This application provides a wireless charging control method, and a wireless charging transmitter and system. The wireless charging transmitter includes an inner-loop control circuit, a boost circuit, an inverter circuit, and a transmitting coil, where the inner-loop control circuit is connected to both the boost circuit and the inverter circuit, and an input end and an output end of the inverter circuit are respectively connected to the boost circuit and the transmitting coil, and the inner-loop control circuit is configured to obtain a first current reference signal and a sampled current signal of the transmitting coil, compare the first current reference signal with the sampled current signal to obtain an absolute value of a difference between the first current reference signal and the sampled current signal, and adjust a phase shift angle of the inverter circuit and/or a duty cycle of the boost circuit when the absolute value is greater than a preset deviation such that after the adjustment, an absolute value of a difference between the first current reference signal and the sampled current signal of the transmitting coil is less than or equal to the preset deviation. In this way, a current adjustment range of the transmitting coil can be effectively expanded to implement optimal efficiency control in a full working range, thereby reducing a power loss of a wireless charging system. Further, in this application, a conduction loss of switch tubes in the inverter circuit and a voltage conversion circuit can be reduced by adding the boost circuit at an input end of the inverter circuit.

DESCRIPTION OF EMBODIMENTS

Wireless charging systems for vehicles mostly use a magnetic resonance principle, that is, a wireless charging receiver located at the bottom of a vehicle and a wireless charging transmitter installed on the ground work together to implement non-contact charging. In an actual wireless charging system, because a relative position between a coil of a wireless charging transmitter (or a transmitting coil) and a coil of a wireless charging receiver (or a receiving coil) may vary, a voltage variation range of a load is relatively wide, a charging characteristic of the load changes, and the like, output impedance of an inverter circuit in the wireless charging transmitter changes. Consequently, a variation range of a current, of the transmitting coil, that needs to be adjusted in a charging process is relatively wide, resulting in a relatively large power loss of the wireless charging system.

Figure 1:
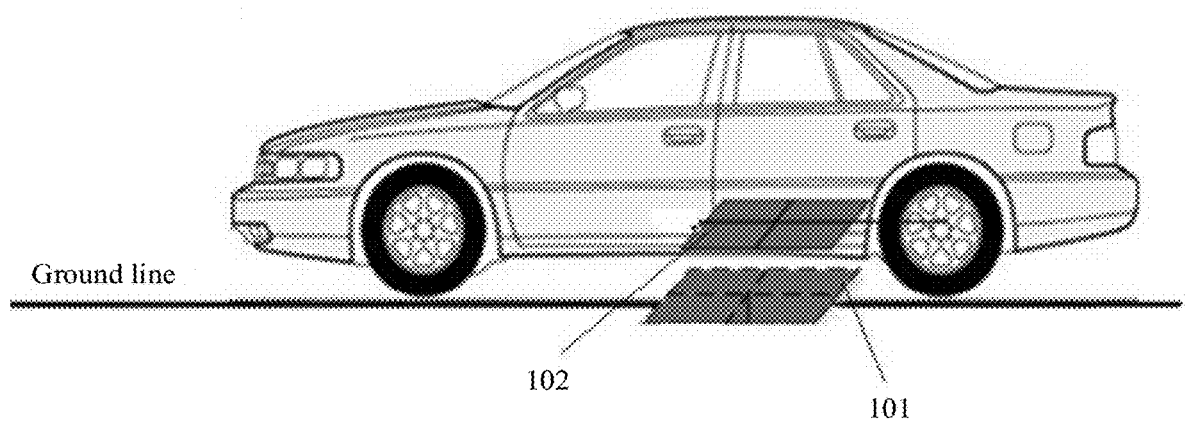
FIG. 1 is a diagram of an application scenario of a technical solution of this application according to an embodiment of this application.

To resolve the foregoing technical problem, this application provides a wireless charging control method, and a wireless charging transmitter and system. Technical solutions of this application are applied to the following application scenarios. FIG. 1 is a diagram of an application scenario of a technical solution of this application according to an embodiment of this application. As shown in FIG. 1, a wireless charging transmitter 101 may be placed on the ground, or half buried or completely buried under the ground or a road, and can perform wireless charging of a vehicle (a wireless charging receiver 102 is disposed at the bottom of the vehicle) above the wireless charging transmitter 101. The wireless charging transmitter 101 and the wireless charging receiver 102 perform wireless energy transmission in a manner such as electric field induction, magnetic induction, magnetic resonance, or wireless radiation, to implement wireless charging of the vehicle. Based on the foregoing application scenario, the following describes the technical solutions of this application in detail.

Embodiment 1

Figure 2:
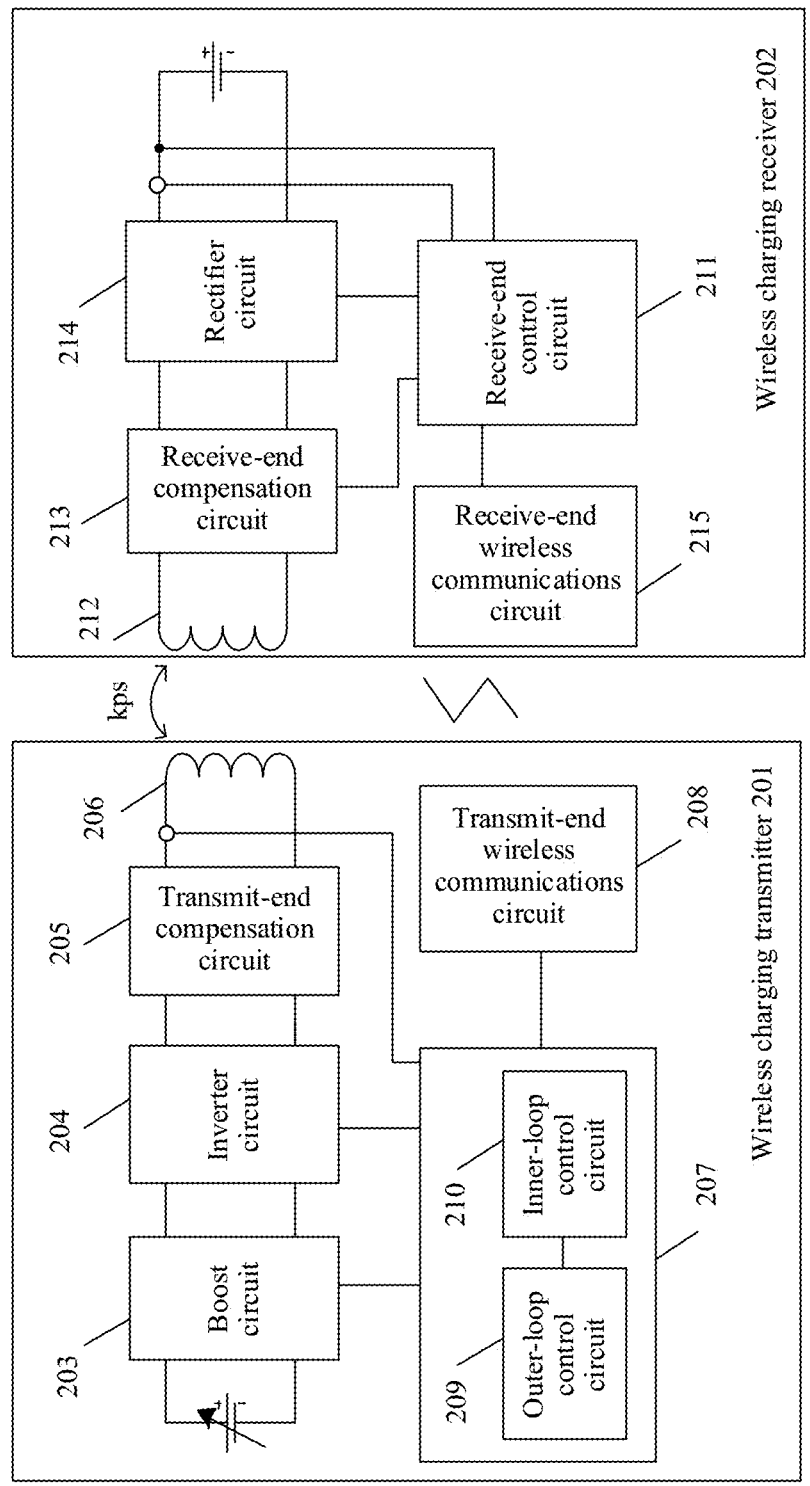
FIG. 2 is a schematic diagram of a wireless charging system according to an embodiment of this application.

FIG. 2 is a schematic diagram of a wireless charging system 200 according to this embodiment of this application. As shown in FIG. 2, the wireless charging system 200 includes a wireless charging transmitter 201 and a wireless charging receiver 202.

The wireless charging transmitter 201 may include at least a boost circuit 203, an inverter circuit 204, a transmit-end compensation circuit 205, a transmitting coil 206, a transmit-end control circuit 207, and a transmit-end wireless communications circuit 208. The transmit-end control circuit 207 includes an outer-loop control circuit 209 and an inner-loop control circuit 210.

The wireless charging receiver 202 may include at least a receive-end control circuit 211, a receiving coil 212, a receive-end compensation circuit 213, a rectifier circuit 214, and a receive-end wireless communications circuit 215.

The boost circuit 203 is configured to obtain a direct current voltage and a duty cycle of the boost circuit, and increase, based on the duty cycle, the direct current voltage obtained by the boost circuit 203. The direct current voltage obtained by the boost circuit 203 may be a fixed voltage or a variable voltage. Optionally, the boost circuit 203 may be a single boost circuit, or may be a parallel circuit formed by a plurality of boost circuits.

An input end of the inverter circuit 204 is connected to an output end of the boost circuit 203. The inverter circuit 204 is configured to convert, into a high-frequency alternating current voltage, the direct current voltage output by the boost circuit 203. The inverter circuit 204 may be a single-phase full-bridge structure with two bridge arms, or may be a three-phase structure with three bridge arms. That is, the inverter circuit 204 may be of a two-level structure or of a three-level structure.

An input end of the transmit-end compensation circuit 205 is connected to an output end of the inverter circuit 204. The transmit-end compensation circuit 205 is configured to compensate an equivalent impedance output by the inverter circuit 204 such that the equivalent impedance output by the inverter circuit 204 is an expected resistive impedance, inductive impedance, resistive-inductive impedance, capacitive impedance, or the like.

The transmitting coil 206 is connected to the transmit-end compensation circuit 205. The transmitting coil 206 is configured to send a high-frequency magnetic field or a high-frequency signal.

The transmit-end control circuit 207 is connected to all of the boost circuit 203, the inverter circuit 204, and the transmitting coil 206. The transmit-end control circuit 207 may be configured to control a first sampled current signal $I_{pric}$, and implement overvoltage protection, undervoltage protection, overtemperature protection, overcurrent protection, and the like.

The outer-loop control circuit 209 in the transmit-end control circuit 207 is configured to obtain a second current reference signal $I_{o\_ref}$ and a second sampled current signal $I_o$, or the outer-loop control circuit 209 is configured to obtain a voltage reference signal and a sampled voltage signal. The following uses an example in which the outer-loop control circuit 209 obtains the second current reference signal $I_{o\_ref}$ and the second sampled current signal $I_o$. The outer-loop control circuit 209 generates a first current reference signal $I_{pric\_ref}$ based on the second current reference signal $I_{o\_ref}$ and the second sampled current signal $I_o$ under control of a controller, and outputs the first current reference signal $I_{pric\_ref}$ to the inner-loop control circuit 210.

An input end of the inner-loop control circuit 210 in the transmit-end control circuit 207 is connected to an output end of the outer-loop control circuit 209, and the inner-loop control circuit 210 is configured to obtain the first current reference signal $I_{pric\_ref}$ and the first sampled current signal $I_{pric}$ of the transmitting coil of the wireless charging transmitter, compare the first current reference signal $I_{pric\_ref}$ with the first sampled current signal $I_{pric}$ to obtain an absolute value of a difference between the first current reference signal $I_{pric\_ref}$ and the first sampled current signal $I_{pric}$, and if the absolute value is greater than a preset deviation δ, adjust a phase shift angle $\theta_{ps}$ of the inverter circuit and/or a duty cycle $D_b$ of the boost circuit such that after the adjustment, an absolute value of a difference between the first current reference signal $I_{pric\_ref}$ and the first sampled current signal $I_{pric}$ of the transmitting coil of the wireless charging transmitter is less than or equal to the preset deviation δ. The phase shift angle $\theta_{ps}$ of the inverter circuit may be a phase shift angle of a drive signal between a leading bridge arm and a lagging bridge arm of the inverter circuit.

The transmit-end wireless communications circuit 208 exchanges information with the transmit-end control circuit 207 through a serial or parallel communications interface. The transmit-end wireless communications circuit 208 is configured to send and receive a control signal, a protection signal, or the like.

The receive-end control circuit 211 is configured to control a controlled signal of the wireless charging receiver, perform analog-to-digital conversion on a sampled current signal, a sampled voltage signal, and the like, perform overvoltage protection, undervoltage protection, overtemperature protection, overcurrent protection, and the like, and send the output controlled signal to a transmit end control circuit 207 for control. The output signal may be a separate output current or a separate output voltage, or may be an output current and an output voltage.

The receiving coil 212 is configured to receive the high-frequency signal or the high-frequency magnetic field transmitted by the transmitting coil 206, and generate an induced voltage through electromagnetic induction.

The receive-end compensation circuit 213 is configured to compensate an equivalent impedance of an input end of the rectifier circuit 214 such that the equivalent impedance of the input end of the rectifier circuit 214 is an expected resistive impedance, inductive impedance, resistive-inductive impedance, capacitive impedance, or the like. The receive-end compensation circuit 213 may be any combinatorial circuit including an inductor and a capacitor.

The rectifier circuit 214 is configured to convert a signal received by the receiving coil 212 into a direct current voltage required by a load. The rectifier circuit 214 may be an uncontrollable circuit including a diode, a controllable circuit including a controllable switch such as a metal-oxide-semiconductor field-effect transistor (MOSFET) or an insulated-gate bipolar transistor (IGBT), a semi-controlled circuit including a thyristor, or a semi-controlled circuit including a combination of a controllable switch and an uncontrollable switch.

The receive-end wireless communications circuit 215 exchanges information with the receive-end control circuit 211 through a serial or parallel communications interface. The receive-end wireless communications circuit 215 is configured to send and receive a control signal, a protection signal, or the like. A control signal or a protection signal may be transmitted between the transmit-end wireless communications circuit 208 and the receive-end wireless communications circuit 215 using BLUETOOTH, WI-FI, ZIGBEE (ZIGBEE), a dedicated short-range communications technology (DSRC), or other communication modes.

The following describes each circuit in the wireless charging system in detail.

Figure 3:
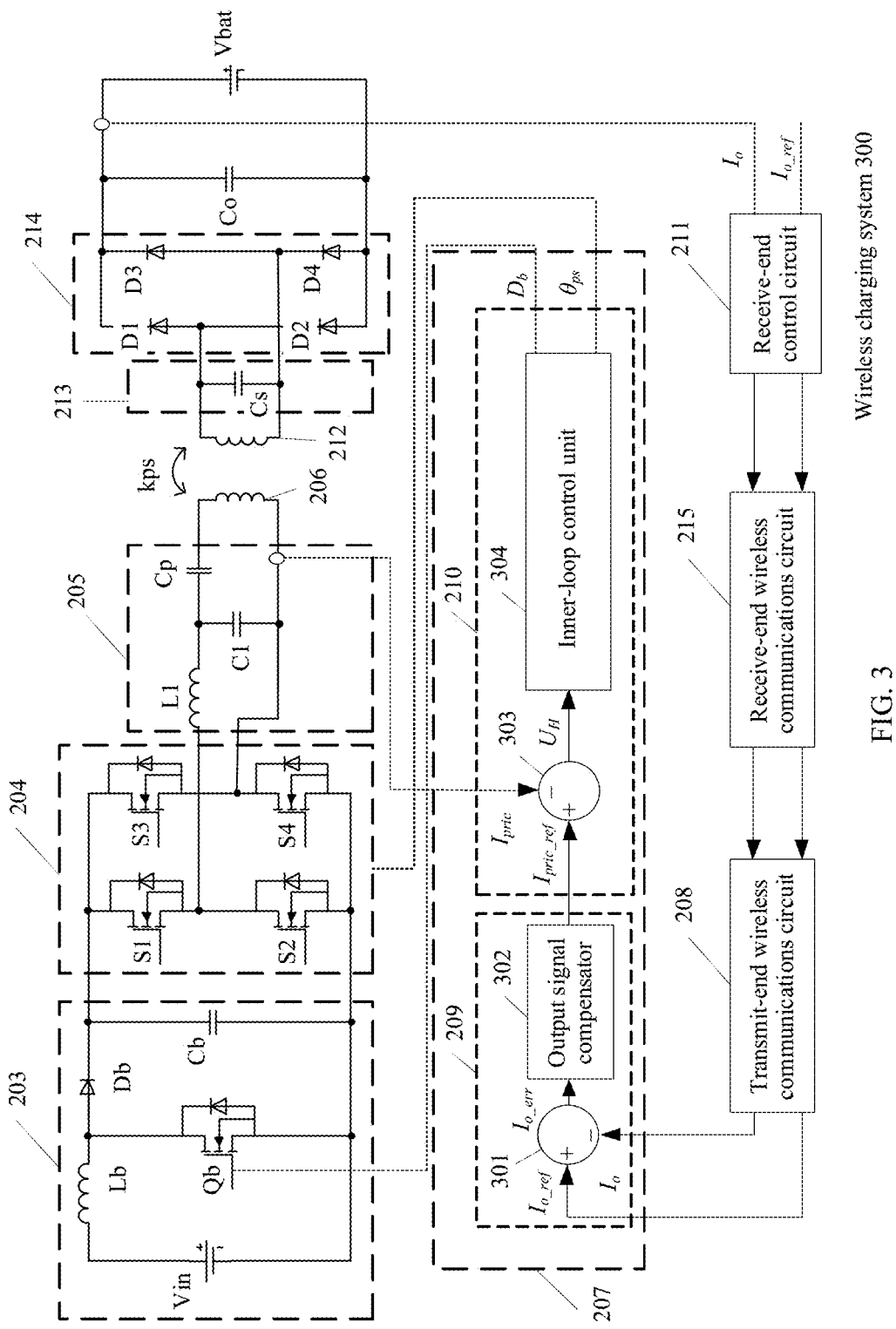
FIG. 3 is a schematic diagram of a wireless charging system according to an embodiment of this application.

Further, FIG. 3 is a schematic diagram of a wireless charging system 300 according to an embodiment of this application. As shown in FIG. 3, the boost circuit 203 includes a power supply Vin, an inductor Lb, a diode Db, a controllable switch Qb, and a capacitor Cb. The inverter circuit 204 includes controllable switches S1, S2, S3, and S4. The transmit-end compensation circuit 205 includes an inductor L1, a capacitor C1, and a capacitor Cp.

The outer-loop control circuit 209 includes a first comparator 301 and an output signal compensator 302, where the first comparator 301 includes two input ends: a positive input end (represented by "+" in FIG. 3) and a negative input end (represented by "−" in FIG. 3), the second current reference signal $I_{0\_ref}$ may be input to the positive input end, and the second sampled current signal $I_0$ may be input to the negative input end. The first comparator 301 obtains a compared deviation $I_{0\_err}$ based on the second current reference signal $I_{0\_ref}$ and the second sampled current signal $I_0$, and outputs the compared deviation $I_{0\_err}$ to the output signal compensator 302. The output signal compensator 302 processes the compared deviation to obtain the first current reference signal $I_{pric\_ref}$.

The inner-loop control circuit 210 includes a second comparator 303 and an inner-loop control unit 304, where the second comparator 303 includes two input ends: a positive input end (represented by "+" in FIG. 3) and a negative input end (represented by "−" in FIG. 3), the first current reference signal $I_{pric\_ref}$ may be input to the positive input end of the second comparator 303, and the first sampled current signal $I_{pric}$ may be input to the negative input end of the second comparator 303. The second comparator 303 obtains a compared deviation $U_H$ based on the first current reference signal $I_{pric\_ref}$ and the first sampled current signal $I_{pric}$, that is, $I_{pric\_ref} - I_{pric} = U_H$. After obtaining $U_H$, the inner-loop control unit 304 calculates an absolute value of $U_H$, and if the absolute value of $U_H$ is greater than the preset deviation δ, adjusts the phase shift angle $\theta_{ps}$ of the inverter circuit and/or the duty cycle $D_b$ of the boost circuit such that after the adjustment, an absolute value of a difference between the first current reference signal $I_{pric\_ref}$ and the first sampled current signal $I_{pric}$ of the transmitting coil of the wireless charging transmitter is less than or equal to the preset deviation δ.

The receive-end compensation circuit 213 includes Cs. The rectifier circuit 214 includes diodes D1, D2, D3, and D4. Optionally, as shown in FIG. 3, the wireless charging receiver 202 further includes a capacitor Co, where Co has a filtering function. The wireless charging receiver 202 further includes a load Vbat, where the load is usually a battery.

This application provides a wireless charging system. The wireless charging system includes a wireless charging transmitter and a wireless charging receiver, where the wireless charging transmitter includes an inner-loop control circuit, a boost circuit, and an inverter circuit, and the inner-loop control circuit is configured to obtain a first current reference signal and a first sampled current signal of a transmitting coil of the wireless charging transmitter, compare the first current reference signal with the first sampled current signal to obtain an absolute value of a difference between the first current reference signal and the first sampled current signal, and adjust a phase shift angle of the inverter circuit and/or a duty cycle of the boost circuit when the absolute value is greater than a preset deviation such that after the adjustment, an absolute value of a difference between the first current reference signal and the first sampled current signal of the transmitting coil of the wireless charging transmitter is less than or equal to the preset deviation. Therefore, the system can effectively expand a current adjustment range of the transmitting coil to implement optimal efficiency control in a full working range, thereby reducing a power loss of a wireless charging system. Further, in this application, a conduction loss of switch tubes in the inverter circuit and a voltage conversion circuit can be reduced by adding the boost circuit at an input end of the inverter circuit.

Embodiment 2

Figure 4:
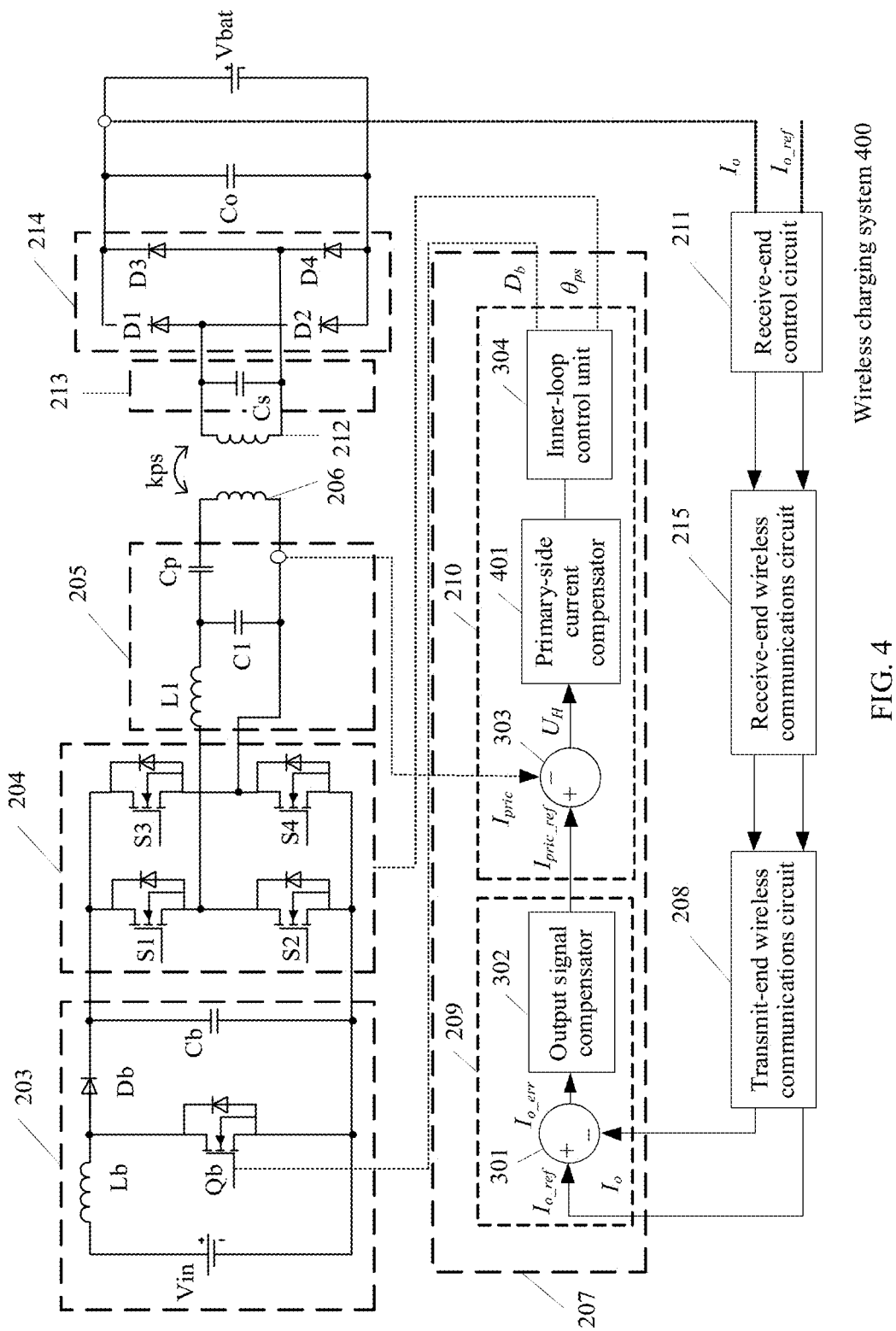
FIG. 4 is a schematic diagram of a wireless charging system according to an embodiment of this application.

Based on Embodiment 1, further, FIG. 4 is a schematic diagram of a wireless charging system 400 according to this embodiment of this application. As shown in FIG. 4, the inner-loop control circuit 210 further includes a primary-side current compensator 401. Further, an input end of the primary-side current compensator 401 may be connected to the second comparator 303, and an output end of the primary-side current compensator 401 may be connected to the inner-loop control unit 304. The inner-loop control circuit 210 is further configured to decrease variation ranges of the duty cycle of the boost circuit 203 and the phase shift angle of the inverter circuit 204 using the primary-side current compensator 401 in order to control a current of the transmitting coil 206. The primary-side current compensator may be a proportional (P) controller, a proportional-integral (PI) controller, or a proportional-integral-derivative (PID) controller in a classical control theory, or a synovial controller in a modern control theory, or the like. This is not limited herein.

To sum up, this application provides the wireless charging system. The inner-loop control circuit in the system further includes the primary-side current compensator. Variation ranges of a duty cycle of the boost circuit and a phase shift angle of the inverter circuit can be controlled using the primary-side current compensator, to implement optimal efficiency control in a full working range, thereby reducing a power loss of the wireless charging system.

Embodiment 3

Figure 5:
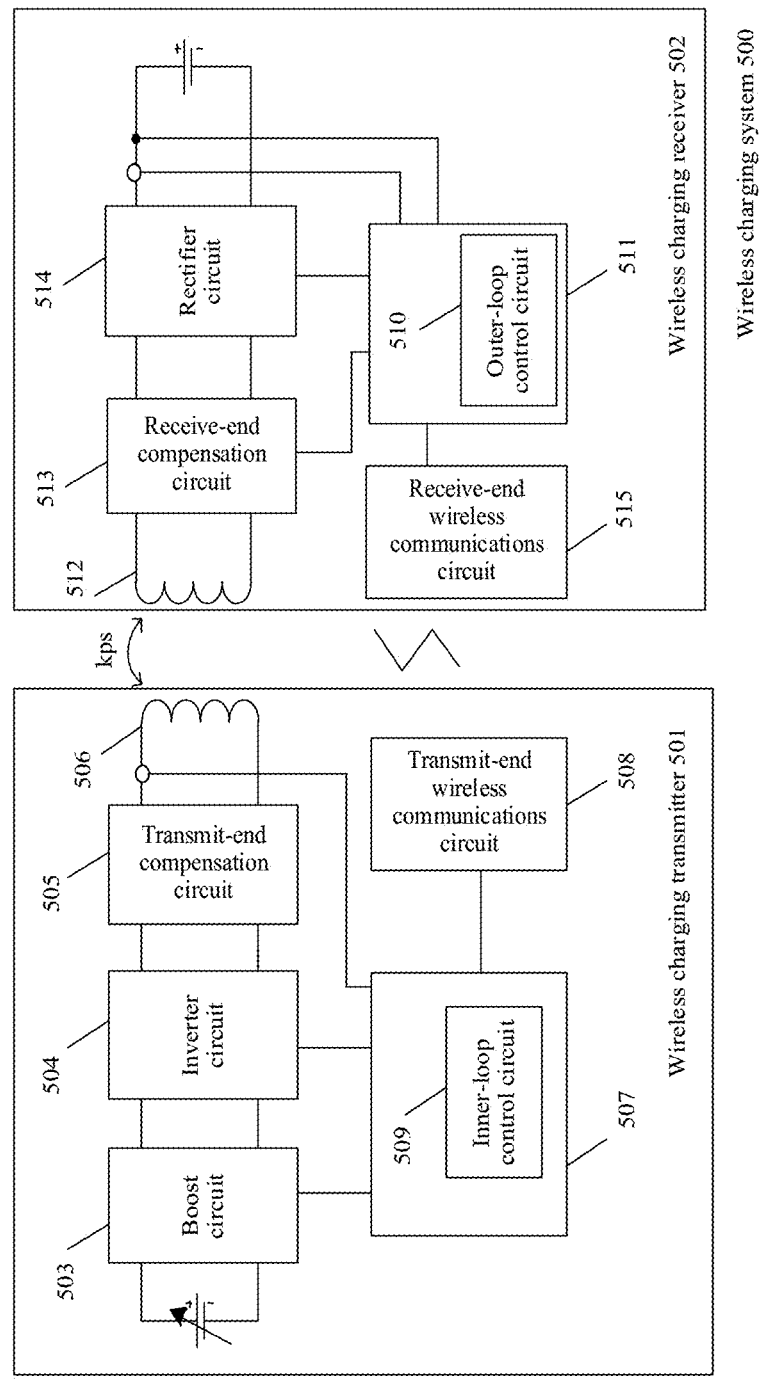
FIG. 5 is a schematic diagram of a wireless charging system according to an embodiment of this application.

FIG. 5 is a schematic diagram of a wireless charging system 500 according to an embodiment of this application. As shown in FIG. 5, the wireless charging system 500 includes a wireless charging transmitter 501 and a wireless charging receiver 502.

The wireless charging transmitter 501 may include at least a boost circuit 503, an inverter circuit 504, a transmit-end compensation circuit 505, a transmitting coil 506, a transmit-end control circuit 507, and a transmit-end communications circuit 508. The transmit-end control circuit 507 includes an inner-loop control circuit 509.

The wireless charging receiver 502 may include at least a receive-end control circuit 511, a receiving coil 512, a receive-end compensation circuit 513, a rectifier circuit 514, and a receive-end wireless communications circuit 515. The receive-end control circuit 511 includes an outer-loop control circuit 510.

The boost circuit 503 is configured to obtain a direct current voltage and a duty cycle of the boost circuit, and increase, based on the duty cycle, the direct current voltage obtained by the boost circuit 503. The direct current voltage obtained by the boost circuit 503 may be a fixed voltage or a variable voltage. Optionally, the boost circuit 503 may be a single boost circuit, or may be a parallel circuit formed by a plurality of boost circuits.

An input end of the inverter circuit 504 is connected to an output end of the boost circuit 503. The inverter circuit 504 is configured to convert, into a high-frequency alternating current voltage, the direct current voltage output by the boost circuit 503. The inverter circuit 504 may be a single-phase full-bridge structure with two bridge arms, or may be a three-phase structure with three bridge arms. That is, the inverter circuit 504 may be of a two-level structure or of a three-level structure.

An input end of the transmit-end compensation circuit 505 is connected to an output end of the inverter circuit 504. The transmit-end compensation circuit 505 is configured to compensate an equivalent impedance output by the inverter circuit 504 such that the equivalent impedance output by the inverter circuit 504 is an expected resistive impedance, inductive impedance, resistive-inductive impedance, capacitive impedance, or the like.

The transmitting coil 506 is connected to the transmit-end compensation circuit 505. The transmitting coil 506 is configured to send a high-frequency magnetic field or a high-frequency signal of the wireless charging transmitter 501.

The transmit-end control circuit 507 is connected to all of the boost circuit 503, the inverter circuit 504, and the transmitting coil 506. The transmit-end control circuit 507 may be configured to perform analog-to-digital conversion, error control, and the like on a first current reference signal $I_{pric\_ref}$ and a first sampled current signal $I_{pric}$, to implement overvoltage protection, undervoltage protection, overtemperature protection, overcurrent protection, and the like.

The outer-loop control circuit 510 in the wireless charging receiver 502 is configured to obtain a second current reference signal $I_{o\_ref}$ and a second sampled current signal $I_o$, or the outer-loop control circuit 510 is configured to obtain a voltage reference signal and a sampled voltage signal. The following uses an example in which the outer-loop control circuit 510 obtains the second current reference signal $I_{o\_ref}$ and the second sampled current signal $I_o$. The outer-loop control circuit 510 generates a first current reference signal $I_{pric\_ref}$ based on the second current reference signal $I_{o\_ref}$ and the second sampled current signal $I_o$, and outputs the first current reference signal $I_{pric\_ref}$ to the inner-loop control circuit 509.

An input end of the inner-loop control circuit 509 in the transmit-end control circuit 507 is connected to an output end of the outer-loop control circuit 510, and the inner-loop control circuit 509 is configured to obtain the first current reference signal $I_{pric\_ref}$ and the first sampled current signal $I_{pric}$ of the transmitting coil of the wireless charging transmitter, compare the first current reference signal $I_{pric\_ref}$ with the first sampled current signal $I_{pric}$ to obtain an absolute value of a difference between the first current reference signal $I_{pric\_ref}$ and the first sampled current signal $I_{pric}$, and if the absolute value is greater than a preset deviation δ, adjust a phase shift angle $θ_{ps}$ of the inverter circuit and/or a duty cycle $D_b$ of the boost circuit such that after the adjustment, an absolute value of a difference between the first current reference signal and the first sampled current signal of the transmitting coil of the wireless charging transmitter is less than or equal to the preset deviation. The phase shift angle $θ_{ps}$ of the inverter circuit may be a phase shift angle of a drive signal between a leading bridge arm and a lagging bridge arm of the inverter circuit.

The transmit-end wireless communications circuit 508 exchanges information with the transmit-end control circuit 507 through a serial or parallel communications interface. The transmit-end wireless communications circuit 508 is configured to send and receive a control signal, a protection signal, or the like.

The receive-end control circuit 511 is configured to control a controlled signal of the wireless charging receiver, perform analog-to-digital conversion on a sampled current signal, a sampled voltage signal, and the like, perform overvoltage protection, undervoltage protection, overtemperature protection, overcurrent protection, and the like, and send the output controlled signal to a transmit end for control. The output signal may be a separate output current or a separate output voltage, or may be an output current and an output voltage.

The receiving coil 512 is configured to receive the high-frequency signal or the high-frequency magnetic field transmitted by the transmitting coil 506, and generate an induced voltage through electromagnetic induction.

The receive-end compensation circuit 513 is configured to compensate an equivalent impedance of an input end of the rectifier circuit 514 such that the equivalent impedance of the input end of the rectifier circuit 514 is an expected resistive impedance, inductive impedance, resistive-inductive impedance, capacitive impedance, or the like. The receive-end compensation circuit 513 may be any combinatorial circuit including an inductor and a capacitor.

The rectifier circuit 514 is configured to convert a signal received by the receiving coil 512 into a direct current voltage required by a load. The rectifier circuit 514 may be an uncontrollable circuit including a diode, a controllable circuit including a controllable switch such as a MOSFET or an IGBT, a semi-controlled circuit including a thyristor, or a semi-controlled circuit including a combination of a controllable switch and an uncontrollable switch.

The receive-end wireless communications circuit 515 exchanges information with the receive-end control circuit 511 through a serial or parallel communications interface. The receive-end wireless communications circuit 515 is configured to send and receive a control signal, a protection signal, or the like. A control signal or a protection signal may be transmitted between the transmit-end wireless communications circuit 508 and the receive-end wireless communications circuit 515 using BLUETOOTH, WI-FI, ZIGBEE, DSRC, or other communication modes.

The following describes each circuit in the wireless charging system in detail.

Figure 6:
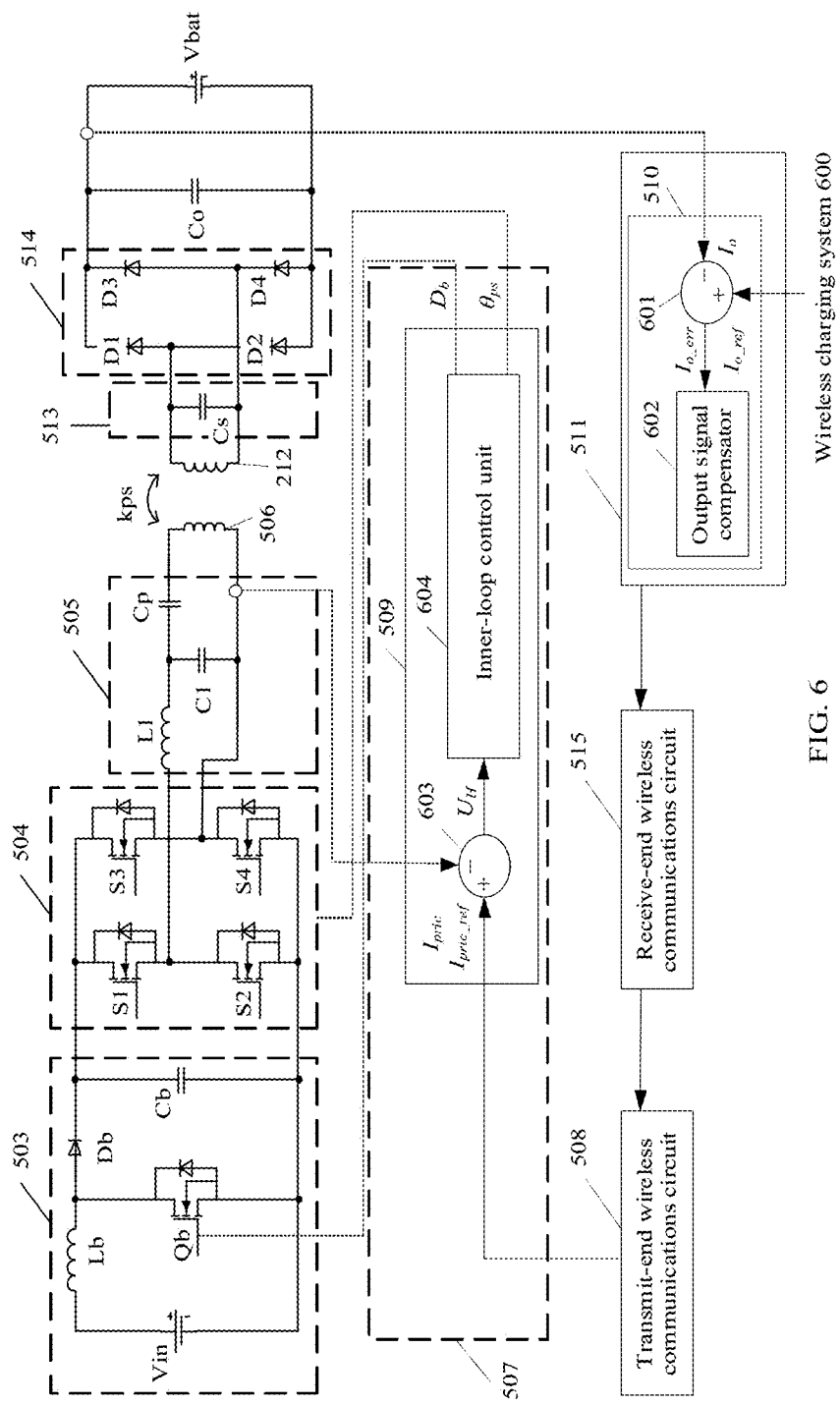
FIG. 6 is a schematic diagram of a wireless charging system according to an embodiment of this application.

Further, FIG. 6 is a schematic diagram of a wireless charging system 600 according to an embodiment of this application. As shown in FIG. 6, the boost circuit 503 includes a power supply Vin, an inductor Lb, a diode Db, a controllable switch Qb, and a capacitor Cb. The inverter circuit 504 includes controllable switches S1, S2, S3, and S4. The transmit-end compensation circuit 505 includes an inductor L1, a capacitor C1, and a capacitor Cp.

The outer-loop control circuit 510 includes a first comparator 601 and an output signal compensator 602, where the first comparator 601 includes two input ends: a positive input end (represented by "+" in FIG. 6) and a negative input end (represented by "−" in FIG. 6), the second current reference signal $I_{0\_ref}$ may be input to the positive input end, and the second sampled current signal $I_0$ may be input to the negative input end. The first comparator 601 obtains a compared deviation $I_{0\_ref}$ based on the second current reference signal $I_{0\_ref}$ and the second sampled current signal $I_0$, and outputs the compared deviation $I_{0\_err}$ to the output signal compensator 602. The output signal compensator 602 processes the compared deviation $I_{0\_err}$ to obtain the first current reference signal $I_{pric\_ref}$.

The inner-loop control circuit 509 includes a second comparator 603 and an inner-loop control unit 604, where the second comparator 603 includes two input ends: a positive input end (represented by "+" in FIG. 6) and a negative input end (represented by "−" in FIG. 6), the first current reference signal $I_{pric\_ref}$ may be input to the positive input end, and the first sampled current signal $I_{pric}$ may be input to the negative input end. The second comparator 603 obtains a compared deviation $U_H$ based on the first current reference signal $I_{pric\_ref}$ and the first sampled current signal $I_{pric}$, that is, $I_{pric\_ref} - I_{pric} = U_H$. After obtaining $U_H$, the inner-loop control unit 604 calculates an absolute value of $U_H$, and if the absolute value of $U_H$ is greater than the preset deviation δ, adjusts the phase shift angle $θ_{ps}$ of the inverter circuit and/or the duty cycle $D_b$ of the boost circuit such that after the adjustment, an absolute value of a difference between the first current reference signal $I_{pric\_ref}$ and the first sampled current signal $I_{pric}$ of the transmitting coil of the wireless charging transmitter is less than or equal to the preset deviation δ.

The receive-end compensation circuit 513 includes Cs. The rectifier circuit 514 includes diodes D1, D2, D3, and D4. Optionally, as shown in FIG. 6, the wireless charging receiver 502 further includes a capacitor Co, where Co has a filtering function. The wireless charging receiver 502 further includes a load Vbat, where the load is usually a battery.

It should be noted that, a difference between Embodiment 3 and Embodiment 1 lies in that The outer-loop control circuit in Embodiment 3 is disposed in the wireless charging receiver, while the outer-loop control circuit in Embodiment 1 is disposed in the wireless charging transmitter. Technical effects of Embodiment 3 and Embodiment 1 are the same, that is, the inner-loop control circuit may be configured to adjust the phase shift angle of the inverter circuit and/or the duty cycle of the boost circuit such that after the adjustment, the absolute value of the difference between the first current reference signal and the sampled current signal of the transmitting coil of the wireless charging transmitter is less than or equal to the preset deviation. Therefore, the system can effectively expand a current adjustment range of the transmitting coil to implement optimal efficiency control in a full working range, thereby reducing a power loss of the wireless charging system. Further, in this application, a conduction loss of switch tubes in the inverter circuit and a voltage conversion circuit can be reduced by adding the boost circuit at an input end of the inverter circuit.

Embodiment 4

Figure 7:
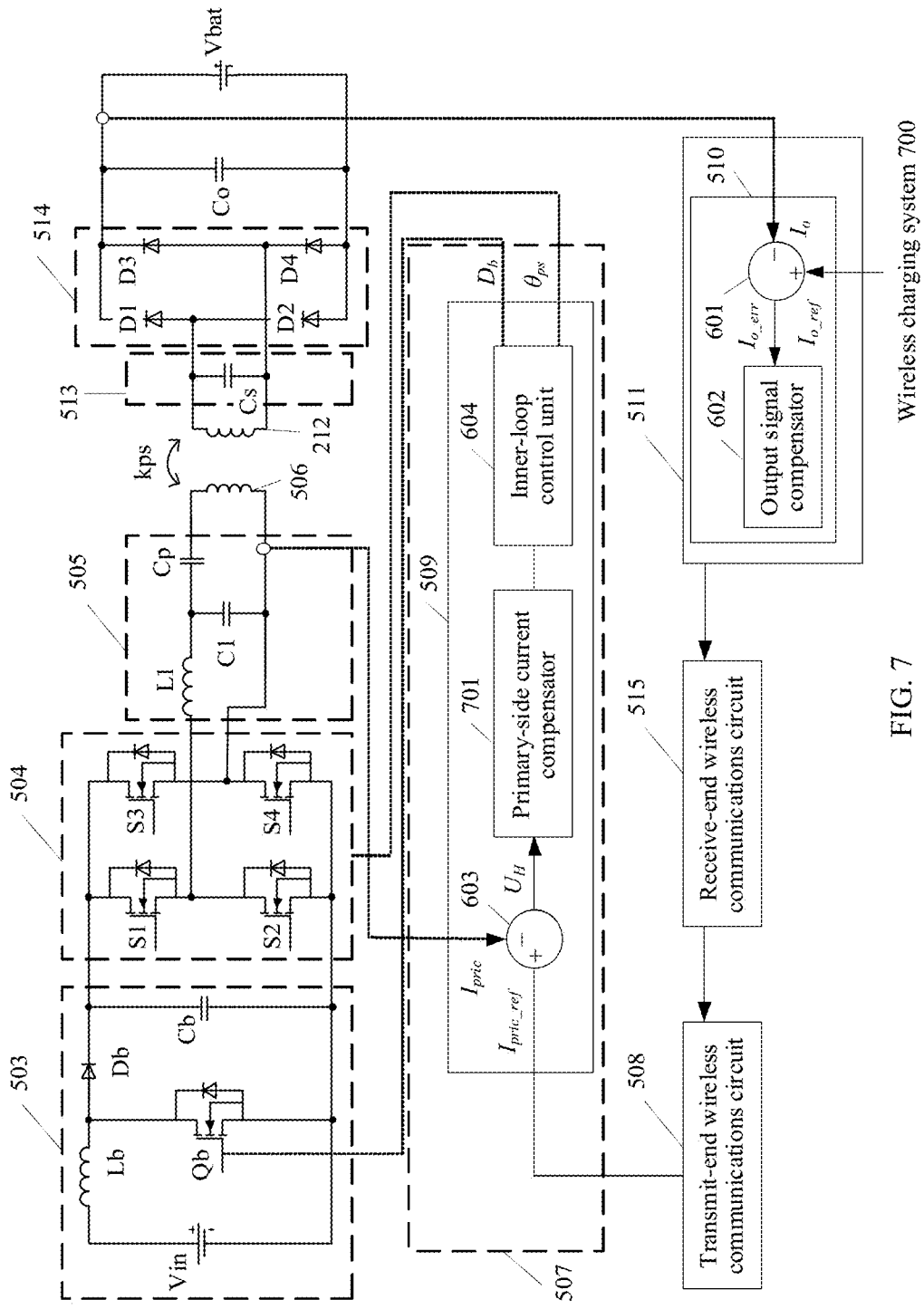
FIG. 7 is a schematic diagram of a wireless charging system according to an embodiment of this application.

Based on Embodiment 3, further, FIG. 7 is a schematic diagram of a wireless charging system 700 according to this embodiment of this application. As shown in FIG. 7, the inner-loop control circuit 509 further includes a primary-side current compensator 701. Further, an input end of the primary-side current compensator 701 may be connected to the second comparator 603, and an output end of the primary-side current compensator 701 may be connected to the inner-loop control unit 604. The inner-loop control circuit 509 is further configured to decrease variation ranges of the duty cycle of the boost circuit 503 and the phase shift angle of the inverter circuit 504 using the primary-side current compensator 701 in order to control a current of the transmitting coil 506.

To sum up, this application provides the wireless charging system. The inner-loop control circuit in the system further includes the primary-side current compensator. The variation ranges of the duty cycle of the boost circuit and the phase shift angle of the inverter circuit can become smaller under control using the primary-side current compensator, to implement optimal efficiency control in a full working range. thereby reducing a power loss of the wireless charging system.

Embodiment 5

Based on any one of the foregoing embodiments, further, the following describes specific functions of the inner-loop control circuit.

In an optional manner 1, the inner-loop control circuit is further configured to if the absolute value of $U_H$ is greater than the preset deviation δ, determine whether the phase shift angle $θ_{ps}$ of the inverter circuit is less than a maximum preset phase shift angle $θ_{max}$, or otherwise, the procedure ends, and if the phase shift angle $θ_{ps}$ of the inverter circuit is less than the maximum preset phase shift angle $θ_{max}$, increase the phase shift angle $θ_{ps}$ of the inverter circuit, and returns to the operation of obtaining the first current reference signal $I_{pric\_ref}$ and the first sampled current signal $I_{pric}$ of the transmitting coil of the wireless charging transmitter, or if the phase shift angle $θ_{ps}$ of the inverter circuit is greater than or equal to the maximum preset phase shift angle $θ_{max}$, determine whether the duty cycle $D_b$ of the boost circuit is less than a maximum preset duty cycle $D_{max}$, and if the duty cycle $D_b$ of the boost circuit is less than the maximum preset duty cycle $D_{max}$, increase the duty cycle $D_b$ of the boost circuit, and obtain the first current reference signal $I_{pric\_ref}$ and the first sampled current signal $I_{pric}$ of the transmitting coil of the wireless charging transmitter, or if the duty cycle $D_b$ of the boost circuit is greater than or equal to the maximum preset duty cycle $D_{max}$, the procedure ends. The maximum preset phase shift angle may be π.

In an optional manner 2, the inner-loop control circuit is further configured to if the absolute value of $U_H$ is greater than the preset deviation δ, determine whether the duty cycle $D_b$ of the boost circuit is less than a maximum preset duty cycle $D_{max}$, or otherwise, the procedure ends, and if the duty cycle $D_b$ of the boost circuit is less than the maximum preset duty cycle $D_{max}$, increase the duty cycle $D_b$ of the boost circuit, and obtain the first current reference signal $I_{pric\_ref}$ and the first sampled current signal $I_{pric}$ of the transmitting coil of the wireless charging transmitter, or if the duty cycle $D_b$ of the boost circuit is greater than or equal to the maximum preset duty cycle $D_{max}$, determine whether the phase shift angle $θ_{ps}$ of the inverter circuit is less than a maximum preset phase shift angle $θ_{max}$, and if the phase shift angle $θ_{ps}$ of the inverter circuit is less than the maximum preset phase shift angle $θ_{max}$, increase the phase shift angle $θ_{ps}$ of the inverter circuit, and obtain the first current reference signal $I_{pric\_ref}$ and the first sampled current signal $I_{pric}$ of the transmitting coil of the wireless charging transmitter, or if the phase shift angle $\theta_{ps}$ of the inverter circuit is greater than or equal to the maximum preset phase shift angle $\theta_{max}$, the procedure ends.

In an optional manner 3, the inner-loop control circuit is further configured to if the absolute value of $U_H$ is greater than the preset deviation $\delta$, determine whether the duty cycle $D_b$ of the boost circuit is greater than a minimum preset duty cycle $D_{min}$, or otherwise, the procedure ends, and if the duty cycle $D_b$ of the boost circuit is greater than the minimum preset duty cycle $D_{min}$, decrease the duty cycle $D_b$ of the boost circuit, and obtain the first current reference signal $I_{pric\_ref}$ and the first sampled current signal $I_{pric}$ of the transmitting coil of the wireless charging transmitter, or if the duty cycle $D_b$ of the boost circuit is less than or equal to the minimum preset duty cycle $D_{min}$, determine whether the phase shift angle $\theta_{ps}$ of the inverter circuit is greater than a minimum preset phase shift angle $\delta_{min}$, and if the phase shift angle $\theta_{ps}$ of the inverter circuit is greater than the minimum preset phase shift angle $\theta_{min}$, decrease the phase shift angle $\theta_{ps}$ of the inverter circuit, and obtain the first current reference signal $I_{pric\_ref}$ and the first sampled current signal $I_{pric}$ of the transmitting coil of the wireless charging transmitter, or if the phase shift angle $\theta_{ps}$ of the inverter circuit is less than or equal to the minimum preset phase shift angle $\theta_{min}$, the procedure ends.

In an optional manner 4, the inner-loop control circuit is further configured to, if the absolute value of $U_H$ is greater than the preset deviation $\delta$, determine whether the phase shift angle $\theta_{ps}$ of the inverter circuit is greater than a minimum preset phase shift angle $\theta_{min}$, or otherwise, the procedure ends, and if the phase shift angle $\theta_{ps}$ of the inverter circuit is greater than the minimum preset phase shift angle $\theta_{min}$, decrease the phase shift angle $\theta_{ps}$ of the inverter circuit, and obtain the first current reference signal $I_{pric\_ref}$ and the first sampled current signal $I_{pric}$ of the transmitting coil of the wireless charging transmitter, or if the phase shift angle $\theta_{ps}$ of the inverter circuit is less than or equal to the minimum preset phase shift angle $\theta_{min}$, determine whether the duty cycle $D_b$ of the boost circuit is greater than a minimum preset duty cycle $D_{min}$, and if the duty cycle $D_b$ of the boost circuit is greater than the minimum preset duty cycle $D_{min}$, decrease the duty cycle $D_b$ of the boost circuit, and obtain the first current reference signal $I_{pric\_ref}$ and the first sampled current signal $I_{pric}$ of the transmitting coil of the wireless charging transmitter, or if the duty cycle $D_b$ of the boost circuit is less than or equal to the minimum preset duty cycle $D_{min}$, the procedure ends.

Based on the foregoing four optional manners, the outer-loop control circuit has the following functions.

Further, in the following, a case in which a second current reference signal $I_{0\_ref}$ is greater than a second sampled current signal $I_0$ is referred to as a power increase case, and a case in which the second current reference signal $I_{0\_ref}$ is less than or equal to the second sampled current signal $I_0$ is referred to as a power decrease case. Alternatively, a case in which a second current reference signal $I_{0\_ref}$ is greater than or equal to a second sampled current signal $I_0$ is referred to as a power increase case, and a case in which the second current reference signal $I_{0\_ref}$ is less than the second sampled current signal $I_0$ is referred to as a power decrease case. In a power increase scenario, for example, after power-on, output power needs to be gradually increased from 0 to required power. In a power decrease scenario, for example, during power-off, output power needs to be gradually decreased from a maximum value to 0.

The outer-loop control circuit may implement any combination of the foregoing four optional manners in the power increase case and the power decrease case. For example, when the outer-loop control circuit determines that power is increased, the outer-loop control circuit sends indication information to the inner-loop control circuit such that the inner-loop control circuit uses the optional manner 1, or when the outer-loop control circuit determines that power is decreased, the outer-loop control circuit sends indication information to the inner-loop control circuit such that the inner-loop control circuit uses the optional manner 2.

Alternatively, when the outer-loop control circuit determines that power is increased, the outer-loop control circuit sends indication information to the inner-loop control circuit such that the inner-loop control circuit uses the optional manner 1, or when the outer-loop control circuit determines that power is decreased, the outer-loop control circuit sends indication information to the inner-loop control circuit such that the inner-loop control circuit uses the optional manner 4.

Alternatively, when the outer-loop control circuit determines that power is increased, the outer-loop control circuit sends indication information to the inner-loop control circuit such that the inner-loop control circuit uses the optional manner 3, or when the outer-loop control circuit determines that power is decreased, the outer-loop control circuit sends indication information to the inner-loop control circuit such that the inner-loop control circuit uses the optional manner 4.

Alternatively, when the outer-loop control circuit determines that power is increased, the outer-loop control circuit sends indication information to the inner-loop control circuit such that the inner-loop control circuit uses the optional manner 3, or when the outer-loop control circuit determines that power is decreased, the outer-loop control circuit sends indication information to the inner-loop control circuit such that the inner-loop control circuit uses the optional manner 2.

This application provides a wireless charging system, where an inner-loop control circuit may be configured to perform adjustment in any of the foregoing four optional manners such that after adjustment, an absolute value of a difference between a first current reference signal and a first sampled current signal of a transmitting coil of a wireless charging transmitter is less than or equal to a preset deviation. Therefore, the system can effectively expand a current adjustment range of the transmitting coil to implement optimal efficiency control in a full working range, thereby reducing a power loss of the wireless charging system. Further, in this application, a conduction loss of switch tubes in the inverter circuit and a voltage conversion circuit can be reduced by adding the boost circuit at an input end of the inverter circuit.

Embodiment 6

Figure 8:
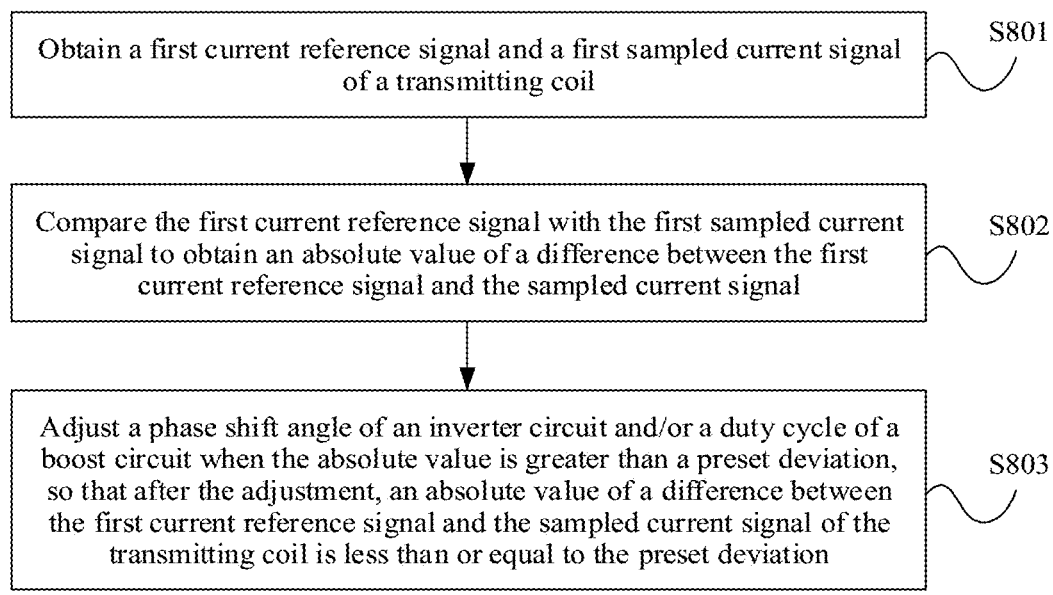
FIG. 8 is a flowchart of a wireless charging control method according to an embodiment of this application.

FIG. 8 is a flowchart of a wireless charging control method according to an embodiment of this application. As shown in FIG. 8, the method is performed by a wireless charging transmitter, an inner-loop control circuit in a wireless charging transmitter, or the like. This is not limited in this application. The method further includes the following procedure.

Step S801. Obtain a first current reference signal and a first sampled current signal of a transmitting coil.

Step S802. Compare the first current reference signal with the first sampled current signal to obtain an absolute value of a difference between the first current reference signal and the sampled current signal.

Step S803. Adjust a phase shift angle of an inverter circuit and/or a duty cycle of a boost circuit when the absolute value is greater than a preset deviation such that after the adjustment, an absolute value of a difference between the first current reference signal and the sampled current signal of the transmitting coil is less than or equal to the preset deviation.

For step S803, there may be at least the following four optional manners

Figure 9A:
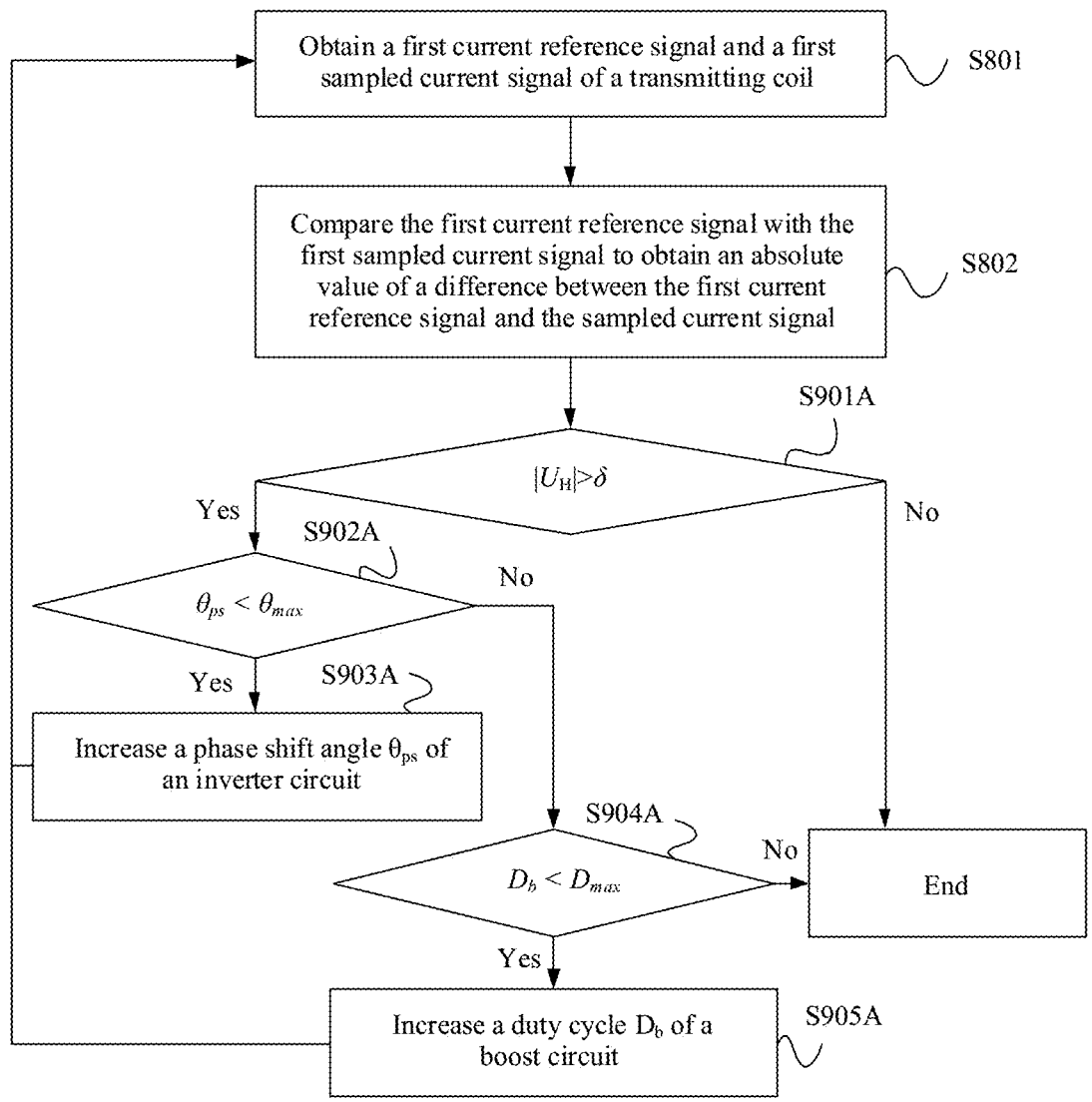
FIG. 9A, FIG. 9B, FIG. 9C, and FIG. 9D are flowcharts of four wireless charging control methods according to this application.

Further, FIG. 9A to FIG. 9D are flowcharts of four wireless charging control methods according to this application. As shown in FIG. 9A, a first wireless charging control method includes the following procedure.

Step S901A. Determine whether $|U_H|>\delta$ holds true, and if $|U_H|>\delta$ holds true, perform step S902A, or if $|U_H|>\delta$ does not hold true, the procedure ends.

Step S902A. Determine whether $\theta_{ps}<\theta_{max}$ holds true, and if $\theta_{ps}<\theta_{max}$ holds true, perform step S903A, or if $\theta_{ps}<\theta_{max}$ does not hold true, perform step S904A.

Step S903A. Increase the phase shift angle $\theta_{px}$ of the inverter circuit, and return to step S801.

Step S904A. Determine whether $D_b<D_{max}$ holds true, and if $D_b<D_{max}$ holds true, perform step S905A, or if $D_b<D_{max}$ does not hold true, the procedure ends.

Step S905A. Increase the duty cycle $D_b$ of the boost circuit, and return to step S801.

Figure 9B:
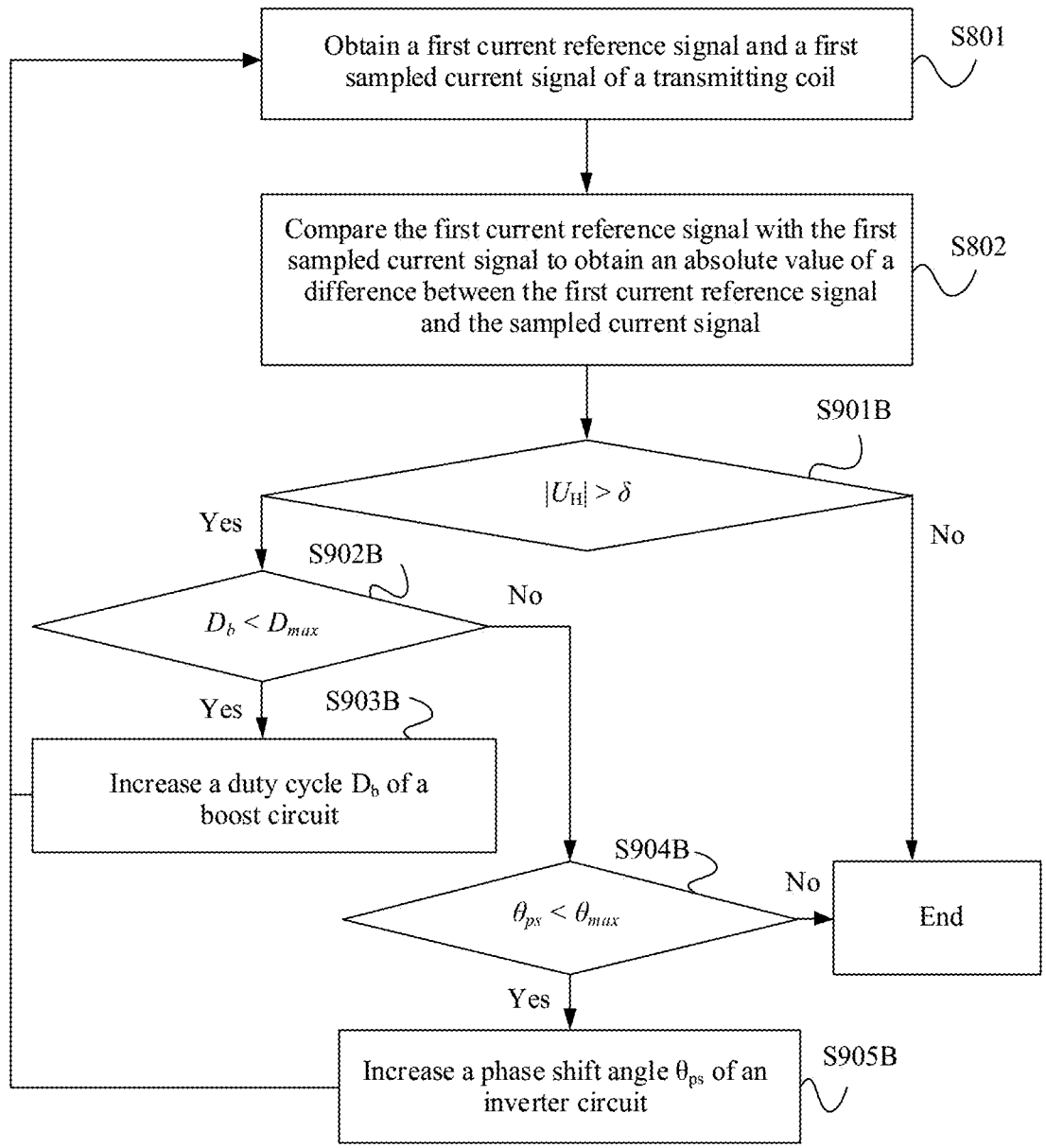

As shown in FIG. 9B, a second wireless charging control method includes the following procedure.

Step S901B. Determine whether $|U_H|>\delta$ holds true, and if $|U_H|>\delta$ holds true, perform step S902B, or if $|U_H|>\delta$ does not hold true, the procedure ends.

Step S902B. Determine whether $D_b<D_{max}$ holds true, and if $D_b<D_{max}$ holds true, perform step S903B, or if $D_b<D_{max}$ does not hold true, perform step S904B.

Step S903B. Increase the duty cycle $D_b$ of the boost circuit, and perform step S801.

Step S904B. Determine whether $\theta_{ps}<\theta_{max}$ holds true, and if $\theta_{ps}<\theta_{max}$ holds true, perform step S905B, or if $\theta_{ps}<\theta_{max}$ does not hold true, the procedure ends.

Step S905B. Increase the phase shift angle $\theta_{ps}$ of the inverter circuit, and perform step S801.

Figure 9C:
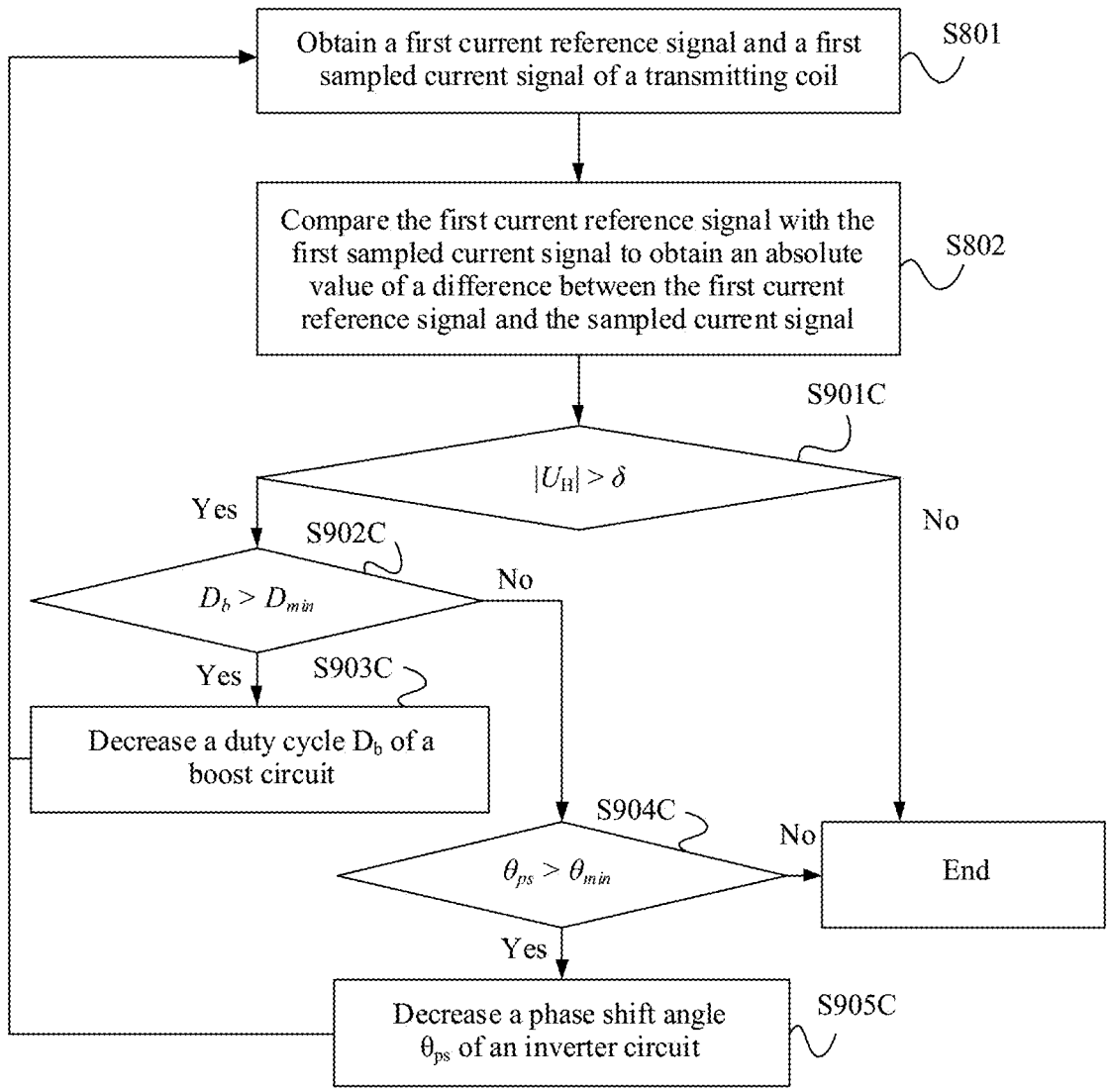

As shown in FIG. 9C, a third wireless charging control method includes the following procedure.

Step S901C. Determine whether $|U_H|>\delta$ holds true, and if $|U_H|>\delta$ holds true, perform step S902C, or if $|U_H|>\delta$ does not hold true, the procedure ends.

Step S902C. Determine whether $D_b>D_{min}$ holds true, and if $D_b>D_{min}$ holds true, perform step S903C, or if $D_b>D_{min}$ does not hold true, perform step S904C.

Step S903C. Decrease the duty cycle $D_b$ of the boost circuit, and perform step S801.

Step S904C. Determine whether $\theta_{ps}>\theta_{min}$ holds true, and if $\theta_{ps}>\theta_{min}$ holds true, perform step S905C, or if $\theta_{ps}>\theta_{min}$ does not hold true, the procedure ends.

Step S905C. Decrease the phase shift angle $\theta_{ps}$ of the inverter circuit, and perform step S801.

Figure 9D:
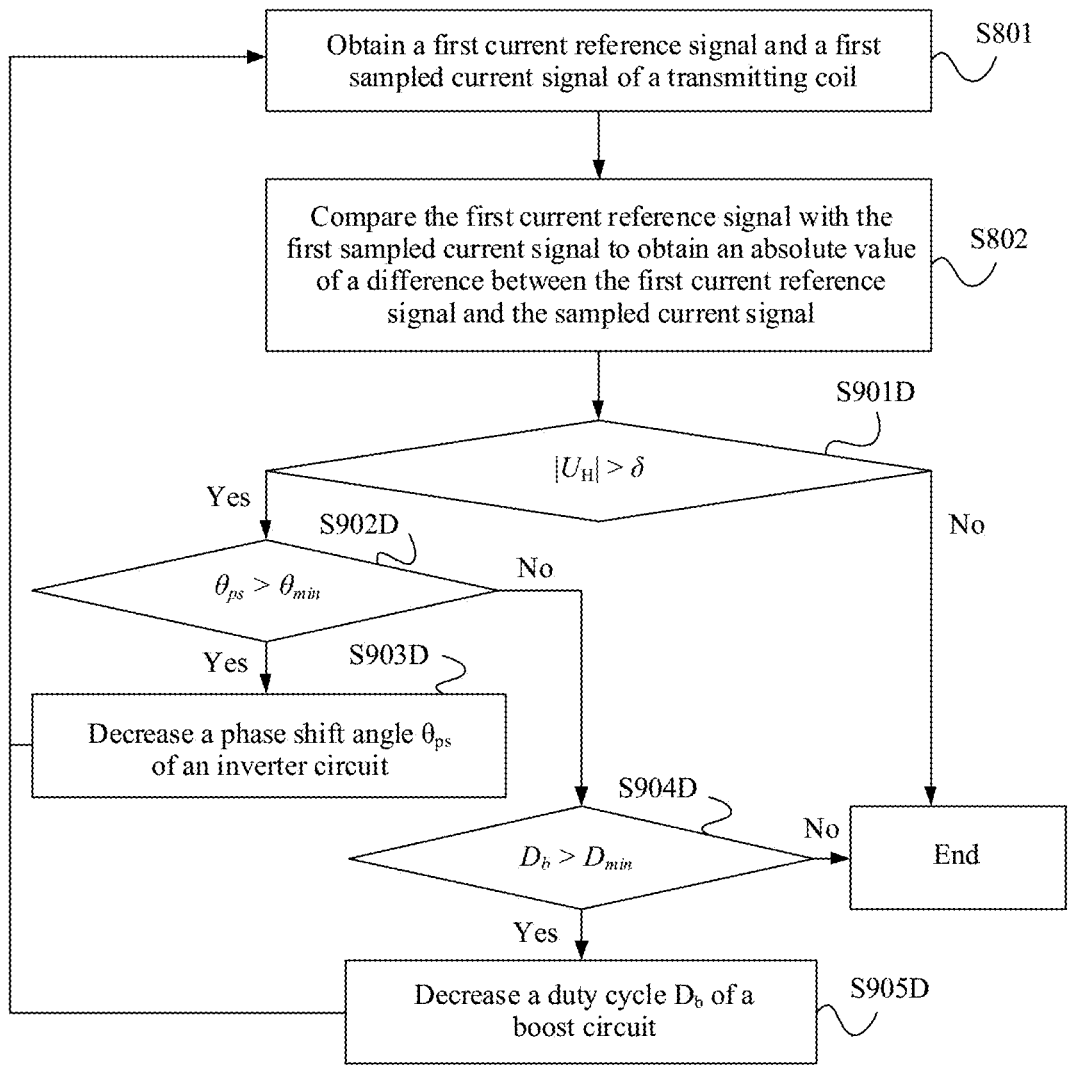

As shown in FIG. 9D, a fourth wireless charging control method includes the following procedure.

Step S901D. Determine whether $|U_H|>\delta$ holds true, and if $|U_H|>\delta$ holds true, perform step S902D, or if $|U_H|>\delta$ does not hold true, the procedure ends.

Step S902D. Determine whether $\theta_{ps}>\theta_{min}$ holds true, and if $\theta_{ps}>\theta_{min}$ holds true, perform step S903D, or if $\theta_{ps}\theta_{min}$ does not hold true, perform step S904D.

Step S903D. Decrease the phase shift angle $\theta_{ps}$ of the inverter circuit, and perform step S801.

Step S904D. Determine whether $D_b>D_{min}$ holds true, and if $D_b>D_{min}$ holds true, perform step S905D, or if $D_b>D_{min}$ does not hold true, the procedure ends.

Step S905D. Decrease the duty cycle $D_b$ of the boost circuit, and perform step S801.

It should be noted that when an outer-loop control circuit is disposed in the wireless charging transmitter, based on the foregoing four optional manners, the wireless charging transmitter may determine, according to the following manner, which optional manner is to be used.

Further, in the following, a case in which a second current reference signal $I_{0\_ref}$ is greater than a second sampled current signal $I_0$ is referred to as a power increase case, and a case in which the second current reference signal $I_{0\_ref}$ is less than or equal to the second sampled current signal $I_0$ is referred to as a power decrease case. Alternatively, a case in which a second current reference signal $I_{0\_ref}$ is greater than or equal to a second sampled current signal $I_0$ is referred to as a power increase case, and a case in which the second current reference signal $I_{0\_ref}$ is less than the second sampled current signal $I_0$ is referred to as a power decrease case. In a power increase scenario, for example, after power-on, output power needs to be gradually increased from 0 to required power. In a power decrease scenario, for example, during power-off, output power needs to be gradually decreased from a maximum value to 0.

The outer-loop control circuit may implement any combination of the foregoing four optional manners in the power increase case and the power decrease case. For example, when the outer-loop control circuit determines that the power is increased, the outer-loop control circuit sends indication information to the inner-loop control circuit such that the inner-loop control circuit uses the optional manner 1, or when the outer-loop control circuit determines that power is decreased, the outer-loop control circuit sends indication information to the inner-loop control circuit such that the inner-loop control circuit uses the optional manner 2.

Alternatively, when the outer-loop control circuit determines that power is increased, the outer-loop control circuit sends indication information to the inner-loop control circuit such that the inner-loop control circuit uses the optional manner 1, or when the outer-loop control circuit determines that power is decreased, the outer-loop control circuit sends indication information to the inner-loop control circuit such that the inner-loop control circuit uses the optional manner 4.

Alternatively, when the outer-loop control circuit determines that power is increased, the outer-loop control circuit sends indication information to the inner-loop control circuit such that the inner-loop control circuit uses the optional manner 3, or when the outer-loop control circuit determines that power is decreased, the outer-loop control circuit sends indication information to the inner-loop control circuit such that the inner-loop control circuit uses the optional manner 4.

Alternatively, when the outer-loop control circuit determines that power is increased, the outer-loop control circuit sends indication information to the inner-loop control circuit such that the inner-loop control circuit uses the optional manner 3, or when the outer-loop control circuit determines that power is decreased, the outer-loop control circuit sends indication information to the inner-loop control circuit such that the inner-loop control circuit uses the optional manner 2.

Optionally, based on any one of the foregoing method embodiments, further, the method further includes controlling a current of the transmitting coil using a primary-side current compensator.

Optionally, based on any one of the foregoing method embodiments, further, the method further includes obtaining, by the wireless charging transmitter, a direct current voltage and the duty cycle of the boost circuit, and increasing the direct current voltage based on the duty cycle of the boost circuit.

It should be noted that the wireless charging method provided in this application may be performed by the wireless charging transmitter or the inner-loop control circuit in the foregoing wireless charging system. Therefore, for content and an effect of this method embodiment, refer to the content and the effect of the system embodiment. Details are not described herein again.

Embodiment 7

This application provides a wireless charging transmitter, including an inner-loop control circuit, a boost circuit, and an inverter circuit, where the inner-loop control circuit is connected to both the boost circuit and the inverter circuit, and an output end of the boost circuit is connected to an input end of the inverter circuit, and the inner-loop control circuit is configured to obtain a first current reference signal and a second sampled current signal of a transmitting coil of the wireless charging transmitter, compare the first current reference signal with the second sampled current signal to obtain an absolute value of a difference between the first current reference signal and the second sampled current signal, and adjust a phase shift angle of the inverter circuit and/or a duty cycle of the boost circuit when the absolute value is greater than a preset deviation such that after the adjustment, an absolute value of a difference between the first current reference signal and the second sampled current signal of the transmitting coil of the wireless charging transmitter is less than or equal to the preset deviation.

Optionally, the inner-loop control circuit is further configured to, when the absolute value is greater than the preset deviation, and the phase shift angle of the inverter circuit is less than a maximum preset phase shift angle, increase the phase shift angle of the inverter circuit, and obtain the first current reference signal and the sampled current signal of the transmitting coil, or when the absolute value is greater than the preset deviation, the phase shift angle of the inverter circuit is greater than or equal to a maximum preset phase shift angle, and the duty cycle of the boost circuit is less than a maximum preset duty cycle, increase the duty cycle of the boost circuit, and obtain the first current reference signal and the sampled current signal of the transmitting coil.

Optionally, the inner-loop control circuit is further configured to, when the absolute value is greater than the preset deviation, and the duty cycle of the boost circuit is less than a maximum preset duty cycle, increase the duty cycle of the boost circuit, and obtain the first current reference signal and the sampled current signal of the transmitting coil, or when the absolute value is greater than the preset deviation, the duty cycle of the boost circuit is greater than or equal to a maximum preset duty cycle, and the phase shift angle of the inverter circuit is less than a maximum preset phase shift angle, increase the phase shift angle of the inverter circuit, and obtain the first current reference signal and the sampled current signal of the transmitting coil.

Optionally, the inner-loop control circuit is further configured to, when the absolute value is greater than the preset deviation, and the duty cycle of the boost circuit is greater than a minimum preset duty cycle, decrease the duty cycle of the boost circuit, and obtain the first current reference signal and the sampled current signal of the transmitting coil, or when the absolute value is greater than the preset deviation, the duty cycle of the boost circuit is less than or equal to a minimum preset duty cycle, and the phase shift angle of the inverter circuit is greater than a minimum preset phase shift angle, decrease the phase shift angle of the inverter circuit, and obtain the first current reference signal and the sampled current signal of the transmitting coil.

Optionally, the inner-loop control circuit is further configured to, when the absolute value is greater than the preset deviation, and the phase shift angle of the inverter circuit is greater than a minimum preset phase shift angle, decrease the phase shift angle of the inverter circuit, and obtain the first current reference signal and the sampled current signal of the transmitting coil, or when the absolute value is greater than the preset deviation, the phase shift angle of the inverter circuit is less than or equal to a minimum preset phase shift angle, and the duty cycle of the boost circuit is greater than a minimum preset duty cycle, decrease the duty cycle of the boost circuit.

Optionally, the inner-loop control circuit includes a primary-side current compensator. Correspondingly, the inner-loop control circuit is further configured to control a current of the transmitting coil using the primary-side current compensator.

Optionally, the boost circuit is configured to obtain a direct current voltage and the duty cycle of the boost circuit, and increase the direct current voltage based on the duty cycle of the boost circuit.

Optionally, the wireless charging transmitter further includes an outer-loop control circuit configured to obtain a second current reference signal and a second sampled current signal, or a voltage reference signal and a sampled voltage signal, and generate the first current reference signal based on the second current reference signal and the second sampled current signal or based on the voltage reference signal and the sampled voltage signal, and output the first current reference signal to the inner-loop control circuit.

To sum up, the wireless charging transmitter provided in this embodiment of this application is the wireless charging transmitter in the foregoing wireless charging system. Therefore, for content and an effect of this embodiment, refer to the content and the effect of the system embodiment. Details are not described herein again.

What is claimed is:
1. An apparatus, comprising:
 a boost circuit;
 a transmitting coil;
 an inverter circuit comprising:
  an input end coupled to the boost circuit; and
  an output end coupled to the transmitting coil; and
 an inner-loop control circuit coupled to the boost circuit and the inverter circuit and configured to:
  obtain a first current reference signal and a sampled current signal of the transmitting coil;
  compare the first current reference signal and the sampled current signal to obtain a first absolute value of a difference between the first current reference signal and the sampled current signal; and adjust a phase shift angle of the inverter circuit or a duty cycle of the boost circuit to obtain a second absolute value of the difference when the first absolute value is greater than a preset deviation, wherein the second absolute value is less than or equal to the preset deviation.

2. The apparatus of claim 1, wherein the inner-loop control circuit is further configured to:

increase the phase shift angle when the first absolute value is greater than the preset deviation and the phase shift angle is less than a maximum preset phase shift angle; and increase the duty cycle when the first absolute value is greater than the preset deviation, the phase shift angle is greater than or equal to the maximum preset phase shift angle, and the duty cycle is less than a maximum preset duty cycle.

3. The apparatus of claim 2, wherein the inner-loop control circuit comprises a primary-side current compensator, and wherein the inner-loop control circuit is further configured to control a current of the transmitting coil using the primary-side current compensator.

4. The apparatus of claim 1, wherein the inner-loop control circuit is further configured to:

increase the duty cycle when the first absolute value is greater than the preset deviation and the duty cycle is less than a maximum preset duty cycle; and increase the phase shift angle when the first absolute value is greater than the preset deviation, the duty cycle is greater than or equal to the maximum preset duty cycle, and the phase shift angle is less than a maximum preset phase shift angle.

5. The apparatus of claim 1, wherein the inner-loop control circuit is further configured to:

decrease the duty cycle when the first absolute value is greater than the preset deviation and the duty cycle is greater than a minimum preset duty cycle; and decrease the phase shift angle when the first absolute value is greater than the preset deviation, the duty cycle is less than or equal to the minimum preset duty cycle, and the phase shift angle is greater than a minimum preset phase shift angle.

6. The apparatus of claim 1, wherein the inner-loop control circuit is further configured to decrease the phase shift angle when the first absolute value is greater than the preset deviation and the phase shift angle is greater than a minimum preset phase shift angle.

7. The apparatus of claim 1, wherein the boost circuit is configured to:

obtain a direct current voltage and the duty cycle; and
increase the direct current voltage based on the duty cycle.

8. The apparatus of claim 1, further comprising an outer-loop control circuit configured to:

obtain either a second current reference signal and a second sampled current signal or a voltage reference signal and a sampled voltage signal;

generate the first current reference signal based on either the second current reference signal and the second sampled current signal or the voltage reference signal and the sampled voltage signal; and output the first current reference signal to the inner-loop control circuit.

9. A method performed by an inner-loop control circuit coupled to a boost circuit and an inverter circuit, the method comprising:

obtaining a first current reference signal and a sampled current signal of a transmitting coil coupled to an output end of the inverter circuit;

comparing the first current reference signal and the sampled current signal to obtain a first absolute value of a difference between the first current reference signal and the sampled current signal; and adjusting a phase shift angle of the inverter circuit or a duty cycle of the boost circuit to obtain a second absolute value of the difference when the first absolute value is greater than a preset deviation, wherein the second absolute value is less than or equal to the preset deviation.

10. The method of claim 9, further comprising:

increasing the phase shift angle when the first absolute value is greater than the preset deviation and the phase shift angle is less than a maximum preset phase shift angle; and increasing the duty cycle when the first absolute value is greater than the preset deviation, the phase shift angle is greater than or equal to the maximum preset phase shift angle, and the duty cycle is less than a maximum preset duty cycle.

11. The method of claim 9, further comprising:

increasing the duty cycle when the first absolute value is greater than the preset deviation and the duty cycle is less than a maximum preset duty cycle; and increasing the phase shift angle when the first absolute value is greater than the preset deviation, the duty cycle is greater than or equal to the maximum preset duty cycle, and the phase shift angle is less than a maximum preset phase shift angle.

12. The method of claim 9, further comprising increasing the phase shift angle when the first absolute value is greater than the preset deviation, the duty cycle is greater than or equal to a maximum preset duty cycle, and the phase shift angle is less than a maximum preset phase shift angle.

13. The method of claim 9, further comprising:

decreasing the duty cycle when the first absolute value is greater than the preset deviation and the duty cycle is greater than a minimum preset duty cycle; and decreasing the phase shift angle when the first absolute value is greater than the preset deviation, the duty cycle is less than or equal to the minimum preset duty cycle, and the phase shift angle is greater than a minimum preset phase shift angle.

14. The method of claim 9, further comprising:

decreasing the phase shift angle when the first absolute value is greater than the preset deviation and the phase shift angle is greater than a minimum preset phase shift angle; and decreasing the duty cycle of the boost circuit when the first absolute value is greater than the preset deviation, the phase shift angle is less than or equal to the minimum preset phase shift angle, and the duty cycle is greater than a minimum preset duty cycle.

15. The method of claim 9, further comprising controlling a current of the transmitting coil using a primary-side current compensator.

16. The method of claim 9, further comprising:

obtaining a direct current voltage and the duty cycle; and
increasing the direct current voltage based on the duty cycle.

17. The method of claim 9, further comprising:

obtaining either a second current reference signal and a second sampled current signal or a voltage reference signal and a sampled voltage signal;

generating the first current reference signal based on either the second current reference signal and the second sampled current signal or the voltage reference signal and the sampled voltage signal; and outputting the first current reference signal.

18. An apparatus, comprising:
a wireless charging receiver; and
a wireless charging transmitter coupled to the wireless charging receiver and comprising:
  a boost circuit;
  a transmitting coil;
  an inverter circuit comprising:
    an input end coupled to the boost circuit; and
    an output end coupled to the transmitting coil; and
  an inner-loop control circuit coupled to the boost circuit and the inverter circuit and configured to:
    obtain a first current reference signal and a sampled current signal of the transmitting coil;
    compare the first current reference signal and the sampled current signal to obtain a first absolute value of a difference between the first current reference signal and the sampled current signal; and
    adjust a phase shift angle of the inverter circuit or a duty cycle of the boost circuit to obtain a second absolute value of the difference when the first absolute value is greater than a preset deviation, wherein the second absolute value is less than or equal to the preset deviation.

19. The apparatus of claim 18, wherein the wireless charging receiver comprises an outer-loop control circuit and is configured to:
  obtain either a second current reference signal and a second sampled current signal or a voltage reference signal and a sampled voltage signal;
  generate the first current reference signal based on either the second current reference signal and the second sampled current signal or the voltage reference signal and the sampled voltage signal; and
  output the first current reference signal to the inner-loop control circuit.

20. The apparatus of claim 18, wherein the inner-loop control circuit is further configured to:
  increase the phase shift angle when the first absolute value is greater than the preset deviation and the phase shift angle is less than a maximum preset phase shift angle; and
  increase the duty cycle when the first absolute value is greater than the preset deviation, the phase shift angle is greater than or equal to the maximum preset phase shift angle, and the duty cycle is less than a maximum preset duty cycle.

* * * * *